US012699190B2

(12) United States Patent
Talbot et al.

(10) Patent No.: US 12,699,190 B2
(45) Date of Patent: Aug. 4, 2026

(54) SYNTHETIC CARRIER PHASE OBSERVABLE GENERATING METHODS AND SYSTEMS FOR USE IN FORMING TIME-DIFFERENCED NAVIGATION SATELLITE SYSTEM OBSERVABLES

(71) Applicant: Trimble Inc., Westminster, CO (US)

(72) Inventors: Nicholas Charles Talbot, Victoria (AU); Xiaoming Chen, Höhenkirchen-Siegertsbrunn (DE)

(73) Assignee: Trimble Inc., Westminster, CO (US)

( * ) Notice: Subject to any disclaimer, the term of this patent is extended or adjusted under 35 U.S.C. 154(b) by 290 days.

(21) Appl. No.: 18/385,214

(22) Filed: Oct. 30, 2023

(65) Prior Publication Data

US 2024/0183996 A1    Jun. 6, 2024

(30) Foreign Application Priority Data

Dec. 2, 2022    (EP) .................................... 22211006

(51) Int. Cl.
*G01S 19/29*          (2010.01)
(52) U.S. Cl.
CPC .................................... *G01S 19/29* (2013.01)
(58) Field of Classification Search
CPC ........ G01S 19/29; G01S 19/44; G01S 19/254; G01S 19/396

(Continued)

(56) References Cited

U.S. PATENT DOCUMENTS 8,624,779 B2    1/2014  Ferguson
2011/0285587 A1 *  11/2011  Vollath .................. G01S 19/071
                                                        342/357.62

(Continued)

FOREIGN PATENT DOCUMENTS

EP        3 130 943 A1    3/2022
EP        3 035 080 A1    8/2022

(Continued)

OTHER PUBLICATIONS

Sickle, J. V., "Two Types of Observables," GEOG 862: GPS and GNSS for Geospatial Professionals, 3 pages retrieved on Nov. 8, 2021 from https://www.e-education.psu.edu/geog862/node/1752.

(Continued)

*Primary Examiner* — Whitney Moore
(74) *Attorney, Agent, or Firm* — Kilpatrick Townsend & Stockton LLP

(57)          ABSTRACT

Some embodiments of the invention pertain to methods carried out by a navigation satellite system (NSS) receiver for estimating parameters useful to determine a position. The receiver observes signals from satellites. Delta carrier phase observables are computed by subtracting observables of different epochs. An estimator uses state variables and computes their values based on the computed delta carrier phase observables. A synthetic carrier phase observable for an anchor epoch is generated, for each carrier phase observable of a terminus epoch for which one of the following applies: (i) a change in phase ambiguity occurred with respect to the corresponding carrier phase observable of the anchor epoch, and (ii) no corresponding carrier phase observable was tracked at the anchor epoch. Generated synthetic carrier phase observables are used to compute delta carrier phase observables between the anchor epoch and an epoch subsequent to the terminus epoch. Systems and vehicles are also disclosed.

13 Claims, 5 Drawing Sheets

(58) Field of Classification Search

USPC ..... 342/352, 357.27, 357.34, 357.62, 357.68

See application file for complete search history.

(56) References Cited

U.S. PATENT DOCUMENTS

| | | | | |
|---|---|---|---|---|
| 2016/0377736 A1* | 12/2016 | Zeitzew | ................. | G01S 19/43 |
| | | | | 342/357.34 |
| 2019/0391274 A1* | 12/2019 | Chen | ...................... | G01S 19/44 |

FOREIGN PATENT DOCUMENTS

| | | | |
|---|---|---|---|
| EP | 4 071 517 A1 | 10/2022 | |
| WO | 2012/151006 A1 | 11/2012 | |

OTHER PUBLICATIONS

Sepulveda, L. E. et al., "Optimizing a Bank of Kalman Filters for Navigation Integrity using Efficient Software Design," GNSS 2021, Proceedings of the 34th International Technical Meeting of the Satellite Division of the Institute of Navigation (ION GNSS + 2021), The Institute of Navigation, Sep. 24, 2021, pp. 2183-2200.

Young, R. S. et al., "Fault Detection and Exclusion Using Normalized Solution Separation and Residual Monitoring Methods," National Journal of the Institute of Navigation, vol. 50, No. 3, Fall 2003, pp. 151-169.

Jiang, Y. et al., "Optimization of Position Domain Relative RAIM for Weak Geometries," 23rd International Technical Meeting of the Satellite Division of the Institute of Navigation, Portland, OR, Sep. 21-24, 2010, pp. 2182-2189.

Zhao, Y., "Applying Time-Differenced Carrier Phase in Nondifferential GPS/IMU Tightly Coupled Navigation Systems to Improve the Positioning Performance," IEEE Transactions on Vehicular Technology, vol. 66, No. 2, Feb. 2017, pp. 992-1003.

Traugott, J. et al., "A Time-Relative Approach for Precise Positioning with a Miniaturized L1 GPS Logger," ION GNSS 21st International Technical Meeting of the Satellite Division, 16-19, Sep. 2008, Savannah, GA, pp. 1883-1894.

Partial European Search Report for Application No. 22206935.3-1206, mailed Apr. 18, 2023, 18 pages.

Extended European Search Report for Application No. 22206935.3-1206, mailed Jul. 12, 2023, 23 pages.

Teunissen, P.J.G., "An Integrity and Quality Control Procedure for use in Multi Sensor Integration," Proceedings of the 3rd International Technical Meeting of the Satellite Division of the Institute of Navigation (ION GPS 1990), Colorado Spring, CO, Sep. 1990, pp. 513-522.

Banville, S. et al., "Improving Real-Time Kinematic PPP with Instantaneous Cycle-Slip Correction," 22nd International Meeting of the Satellite Division of The Institute of Navigation, Savannah, GA, Sep. 22-25, 2009, pp. 2470-2478.

Extended European Search Report for Application No. 22211006.6-1206, mailed May 12, 2023, 11 pages.

* cited by examiner

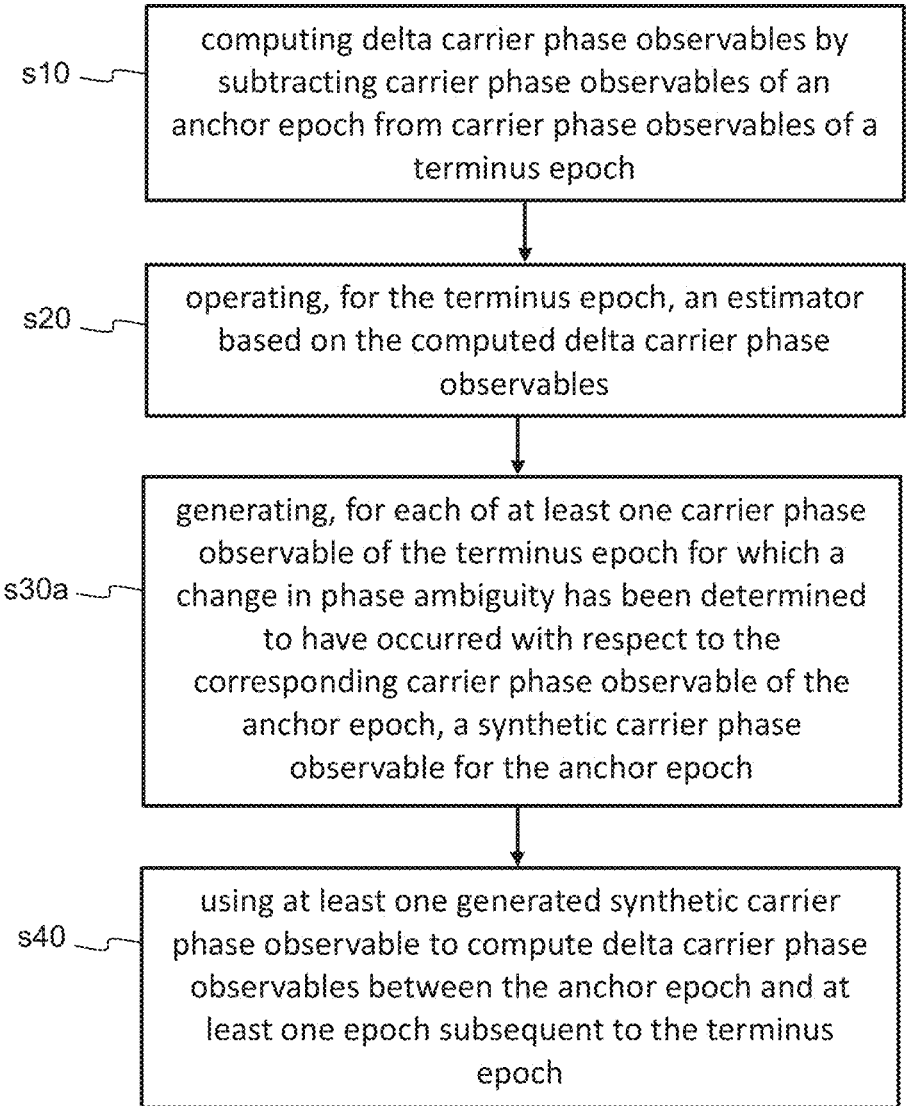

s10 — computing delta carrier phase observables by subtracting carrier phase observables of an anchor epoch from carrier phase observables of a terminus epoch s20 — operating, for the terminus epoch, an estimator based on the computed delta carrier phase observables s30a — generating, for each of at least one carrier phase observable of the terminus epoch for which a change in phase ambiguity has been determined to have occurred with respect to the corresponding carrier phase observable of the anchor epoch, a synthetic carrier phase observable for the anchor epoch s40 — using at least one generated synthetic carrier phase observable to compute delta carrier phase observables between the anchor epoch and at least one epoch subsequent to the terminus epoch

Fig. 1

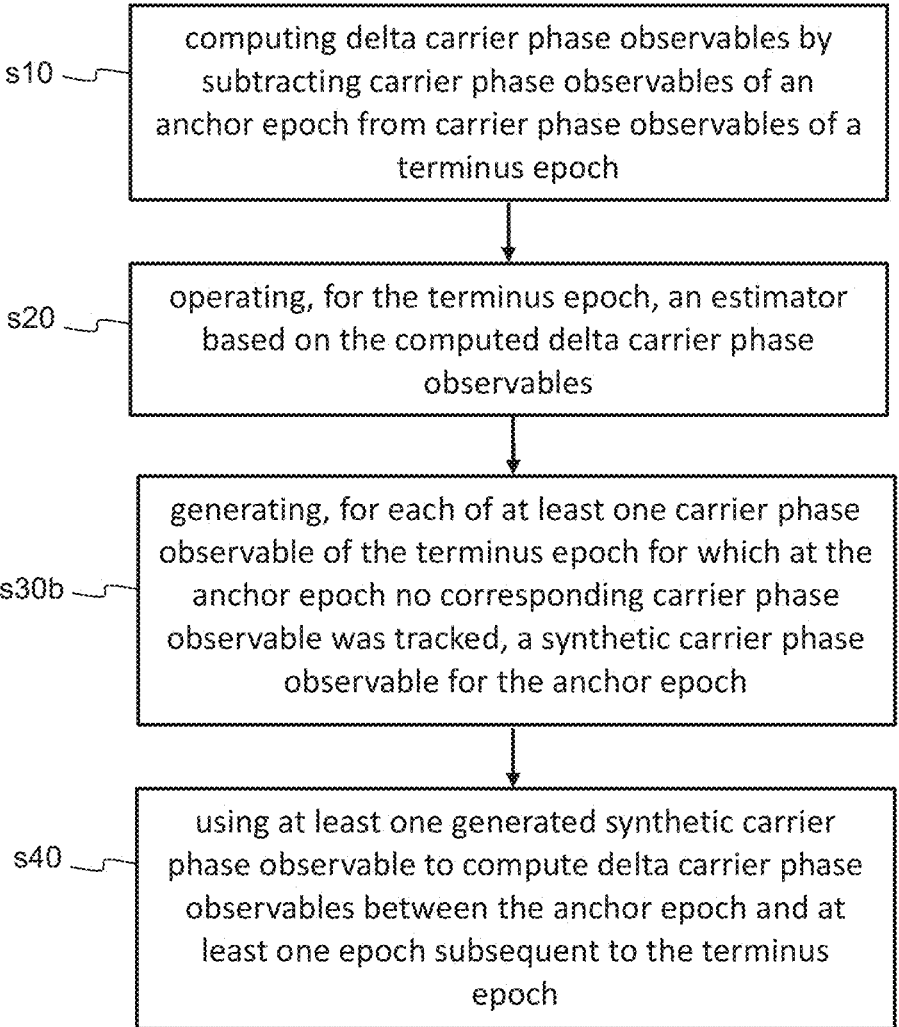

s10    computing delta carrier phase observables by subtracting carrier phase observables of an anchor epoch from carrier phase observables of a terminus epoch s20    operating, for the terminus epoch, an estimator based on the computed delta carrier phase observables s30b    generating, for each of at least one carrier phase observable of the terminus epoch for which at the anchor epoch no corresponding carrier phase observable was tracked, a synthetic carrier phase observable for the anchor epoch s40    using at least one generated synthetic carrier phase observable to compute delta carrier phase observables between the anchor epoch and at least one epoch subsequent to the terminus epoch

Fig. 2

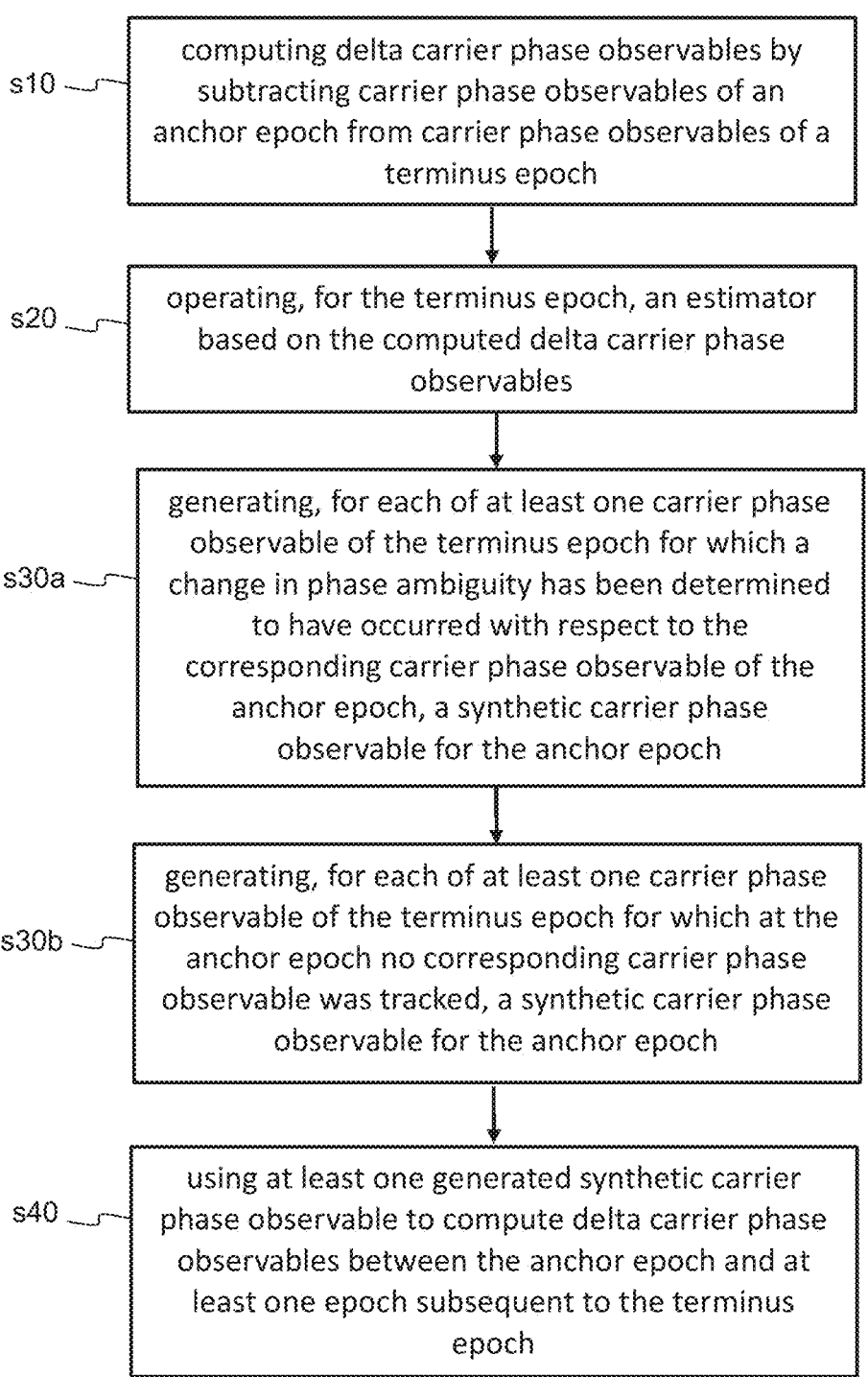

s10 — computing delta carrier phase observables by subtracting carrier phase observables of an anchor epoch from carrier phase observables of a terminus epoch s20 — operating, for the terminus epoch, an estimator based on the computed delta carrier phase observables s30a — generating, for each of at least one carrier phase observable of the terminus epoch for which a change in phase ambiguity has been determined to have occurred with respect to the corresponding carrier phase observable of the anchor epoch, a synthetic carrier phase observable for the anchor epoch s30b — generating, for each of at least one carrier phase observable of the terminus epoch for which at the anchor epoch no corresponding carrier phase observable was tracked, a synthetic carrier phase observable for the anchor epoch s40 — using at least one generated synthetic carrier phase observable to compute delta carrier phase observables between the anchor epoch and at least one epoch subsequent to the terminus epoch

Fig. 3

SYNTHETIC CARRIER PHASE OBSERVABLE GENERATING METHODS AND SYSTEMS FOR USE IN FORMING TIME-DIFFERENCED NAVIGATION SATELLITE SYSTEM OBSERVABLES

CROSS-REFERENCE TO RELATED APPLICATIONS

The present application claims priority to European Patent Application No. 22211006.6, filed Dec. 2, 2022, the entire contents of which are incorporated herein by reference for all purposes.

FIELD OF TECHNOLOGY

The invention relates to methods, systems, and computer programs using navigation satellite system (NSS) observations for position estimation, trajectory estimation, or for other purposes. The fields of application of the methods, systems, and computer programs include, but are not limited to, navigation, highly automated driving, autonomous driving, mapmaking, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BDS (China), QZSS (Japan), and the Indian Regional Navigational Satellite System (IRNSS, also referred to as NAVIC) (systems in use or in development). An NSS typically uses a plurality of satellites orbiting the Earth. The plurality of satellites forms a constellation of satellites. An NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS, and Galileo is provided for example in sections 9, 10, and 11 of reference [1] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors, and multipath propagation.

The carrier signals transmitted by the NSS satellites can also be tracked to provide an alternative, or complementary means of determining the range, or change in range between the receiver and satellite. Carrier phase measurements from multiple NSS satellites facilitate estimation of the position of the NSS receiver.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, has an effective chip length that is much longer than one cycle of the carrier on which the code is modulated. Code and carrier phase measurements have precisions that are roughly the same fraction of the respective chip length or wavelength. The position resolution may therefore be viewed as greater for carrier phase detection than for code detection.

However, in the process of estimating the position based on carrier phase measurements, the carrier phases are ambiguous by an unknown number of cycles. The fractional phase of a received signal can be determined but the additional number of cycles required to determine the satellite's range cannot be directly determined in an unambiguous manner. This is the so-called "integer ambiguity problem", "integer ambiguity resolution problem", or "phase ambiguity resolution problem", which may be solved to yield the so-called fixed-ambiguity solution (sometimes referred to simply as the fixed solution).

GNSS observation equations for code observations and for carrier phase observations are for instance provided in reference [1], section 5. An introduction to the GNSS integer ambiguity resolution problem, and its conventional solutions, is provided in reference [1], section 7.2. The person skilled in the art will recognize that the same or similar principles apply to RNSS.

The main GNSS observables are therefore the carrier phase and code (pseudorange), the former being generally much more precise than the latter, but ambiguous. These observables enable a user to obtain the geometric distance from the receiver to the satellite. With known satellite position and satellite clock error, the receiver position and receiver clock error can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD).

Signals are also transmitted on L2, for civil users and DoD-authorized users. Each GPS signal at the L1 and L2 frequencies is modulated with a pseudo-random noise (PRN) code, and optionally with satellite navigation data. When GNSS satellites broadcast signals that do not contain navigation data, these signals are sometimes termed "pilot" signals, or "data-free" signals. In relation to GPS, two different PRN codes are transmitted by each satellite: a C/A code and a P code which is encrypted for DoD-authorized users to become a Y code. Each C/A code is a unique sequence of 1023 bits, which is repeated each millisecond. Other NSS systems also have satellites transmitting multiple signals on multiple carrier frequencies.

Furthermore, the forming of time-differenced carrier phase observables and the processing thereof, said processing being also referred to as "delta phase" processing, are known in the art for precise position propagation to the current epoch. The basic delta phase processing principles are explained for example in reference [2], pp. 11-13, paragraphs to [0047]. Namely, "[i]f carrier phase tracking is maintained, the delta phase measurements give a precise measure of the change in range (distance) between user and satellite over time" (ibid., p. 11, paragraph [0036]). The precise measure of the change in range notably stems from the fact that, in the delta phase observation equation, the carrier phase ambiguity term cancels out (ibid., p. 12, paragraphs and [0045]).

There is a constant need for improving the implementation of positioning or similar systems making use of NSS observables and, in particular, systems in which time-differenced carrier phase observables, also called "delta carrier phase observables" or "delta-carrier-phase observables", are formed and then used for estimating trajectories or for other purposes. In this context, periods of changing satellite measurement geometry, for example, may pose challenges in terms of maintaining accuracy and availability of a positioning solution.

SUMMARY

The present invention aims at addressing the above-mentioned need. The invention includes methods, systems, computer programs, computer program products, and storage mediums as defined in the independent claims. Particular embodiments are defined in the dependent claims.

In one embodiment, a method is carried out by at least one of a navigation satellite system receiver, hereinafter abbreviated as "NSS receiver", and a processing entity capable of receiving data from the NSS receiver, for estimating parameters useful to, i.e. suitable to, determine a position. The NSS receiver observes NSS signals from a plurality of NSS satellites. The method comprises the following steps and/or operations. Time-differenced carrier phase observables, hereinafter referred to as "delta carrier phase observables", are computed by subtracting carrier phase observables of an epoch, hereinafter referred to as "anchor epoch", from carrier phase observables of a subsequent epoch, hereinafter referred to as "terminus epoch". An estimation process, hereinafter referred to as "estimator", is operated for the terminus epoch, the estimator using state variables and computing values of its state variables at least based on the computed delta carrier phase observables. Further, a synthetic carrier phase observable for the anchor epoch is generated, for each of at least one carrier phase observable of the terminus epoch for which one of the following applies: (i) a change in phase ambiguity has been determined to have occurred with respect to the corresponding carrier phase observable of the anchor epoch, and, (ii) at the anchor epoch, no corresponding carrier phase observable was tracked. At least one generated synthetic carrier phase observable is then used to compute delta carrier phase observables between the anchor epoch and at least one epoch subsequent to the terminus epoch.

The generation of synthetic carrier phase observable(s) as described above has been found to be generally beneficial, for example, but not only, for (a) handling carrier phase tracking interruptions, for (b) including carrier phase measurements from newly acquired satellites (or carrier phase measurements associated with newly acquired frequency bands from a satellite) into a delta-carrier-phased-based estimation process, or at least for one of these two goals (a) and (b). In turn, achieving these goals, or at least one of them, is generally beneficial in terms of maintaining accuracy and availability of the solution.

In one embodiment, a system comprises at least one of: a NSS receiver, and a processing entity capable of receiving data from the NSS receiver, the system being for estimating parameters useful to, i.e. suitable to, determine a position, the NSS receiver being configured for observing NSS signals from a plurality of NSS satellites, and the system being configured for carrying out the above-described method. In one embodiment, a vehicle comprises such a system.

In some embodiments, computer programs, computer program products and storage media for storing such computer programs are provided. Such computer programs comprise computer-executable instructions configured for carrying out, when executed on a computer such as one embedded in, or otherwise part of, a NSS receiver or in another apparatus, or when executed on a set of computers such as a set of computers embedded in, or otherwise part of, a set of apparatuses, the above-described method.

BRIEF DESCRIPTION OF THE DRAWINGS

Embodiments of the present invention shall now be described in conjunction with the appended drawings in which:

FIGS. 1 and 2 schematically illustrate flowcharts of methods in two embodiments of the invention;

FIG. 3 schematically illustrates a flowchart of a method in one embodiment of the invention, which combines steps of the embodiments illustrated in FIGS. 1 and 2;

DETAILED DESCRIPTION

Figure 4:
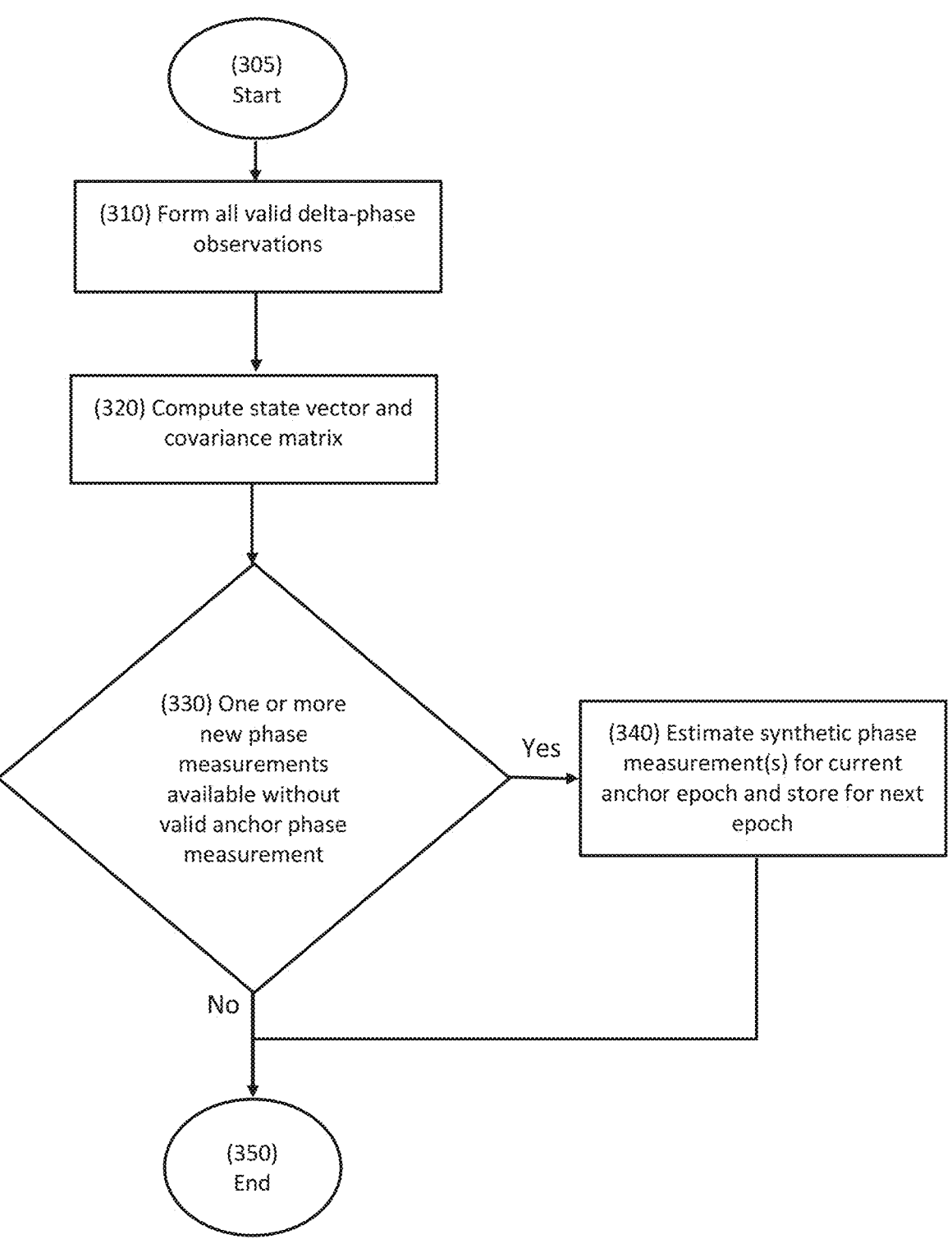
FIG. 4 schematically illustrates a further method in one embodiment of the invention.

The present invention shall now be described in conjunction with specific embodiments. These serve to provide the skilled person with a better understanding but are not intended to in any way restrict the scope of the invention, which is defined by the appended claims. In particular, the embodiments described throughout the description can be combined to form further embodiments to the extent that they are not mutually exclusive.

Throughout the following description, the abbreviation "GNSS" is sometimes used. The invention is, however, not limited to global navigation satellite systems (GNSS) but also applies to regional navigation satellite systems (RNSS). Thus, it is to be understood that each occurrence of "GNSS" in the following can be replaced with "RNSS" to form additional embodiments.

In the art, the term "observables" is often used to refer to structures of an NSS signal from which observations or measurements can be made (PRN-code, carrier phase) (see e.g. reference [3]: "The word observable is used throughout GPS literature to indicate the signals whose measurement yields the range or distance between the satellite and the receiver."). However, in common usage, and in the present document, the term "observable" (also referred to as "NSS observable") is also interchangeably used to refer to the observation itself, such that, for example, "carrier phase observable" has the same meaning as "carrier phase observation". Further, when the present document describes that an NSS signal is observed, this means that at least an observation (measurement) of at least an observable of the NSS signal is made. By extension, in the present document, terms such as "delta carrier phase observables" (also referred to as "time-differenced carrier phase observables")

are also sometimes used although delta carrier phase observables are strictly speaking not directly observed but constructed, i.e. formed by computation, based on observables.

When the term "real-time" is used in the present document, it means that there is an action (e.g., data is processed, results are computed) as soon as the required information for that action is available. Thus, certain latency exists, which depends on various aspects depending on the involved component(s) of the system.

When the verb "broadcast" (and "broadcasting", etc.) is used, this also covers embodiments where the transmission is a form of multicasting.

When the term "synthetic" in the expressions "synthetic carrier phase observable", "synthetic carrier phase measurement", "synthetic carrier phase observation", "synthetic anchor observations", or the like is used, the term means that the synthetic carrier phase observable has characteristics of a carrier phase observable measured or observed from a NSS signal, but is not observed from a NSS signal. Thus, it can be used as a substitute for a carrier phase observable.

The forming and processing of delta-carrier-phase observables, sometimes referred to simply as "delta phase" processing, is an effective approach for low-latency, precise position propagation to the current epoch. Specifically, the processing of delta-carrier-phase observables, some forms of which are known in the art, is beneficial in that the integer ambiguities in the carrier phases are cancelled out (as explained above with reference to reference [2]) during observation differencing so that a trajectory can be computed without the need to resolve ambiguities.

The processing of delta-carrier-phase observables may go through the following steps:

(step 1) Computing delta-carrier-phase observables by differencing previous-epoch and current-epoch observables. This computation may be expressed mathematically as follows:

$$deltacarrierphase(t_k) = carrierphase(t_k) - carrierphase(t_{k-1})$$

where:

$t_k$ is the current epoch;

$t_{k-1}$ is the previous epoch; and carrierphase($t_i$) is the carrier phase observation at epoch $t_i$.

Besides, the carrier phase measurement in meters can be expressed as follows:

$$carrierphase(t) = range(t) + tropo(t) - iono(t) + rcvclock(t) + \lambda * N + noise(t)$$

where:

the sign * denotes a multiplication;

range(t) is the satellite-to-receiver distance taking the satellite clock into account;

tropo(t) and iono(t) are the troposphere and ionosphere delays, respectively;

rcvclock(t) accounts for the receiver clock;

noise(t) accounts for the observation noise and multipath errors;

$\lambda$ is the wavelength of the carrier phase observable under consideration; and N is an integer value (a so-called integer ambiguity), which remains constant unless a cycle slip or loss-of-lock occurs.

As can be seen from the above, when computing deltacarrierphase($t_k$), unknown value N cancels out. Atmospheric effects are highly correlated in time. Thus, tropo($t_k$)–tropo($t_{k-1}$) and iono($t_k$)–iono($t_{k-1}$) are expected to be very small. The remaining parts are rcvclock($t_k$)–rcvclock($t_{k-1}$) and the actual change in receiver position, or more precisely the actual change in receiver's antenna position (as also expressed for example in reference [2], p. 13, paragraph [0047]), provided that, as a skilled person would understand, the change in satellite geometry is properly compensated for by using available satellite ephemeris and satellite clock estimates.

(step 2) Processing the data in e.g. a Kalman filter to compute the position increment between two epochs.

(step 3) Accumulating small position increments into a precise position trajectory. This accumulation may be expressed mathematically as follows:

$$deltaposition(t_k, t_m) = \sum_{i=k+1}^{i=m} deltaposition(t_i)$$

where:

deltaposition($t_i$) is a computed position increment between epochs $t_{i-1}$ and $t_i$; and deltaposition($t_k, t_m$) is a resultant position increment for the time interval between $t_k$ and $t_m$.

(step 4) The computed precise trajectory can then be used for precise position propagation. This may be expressed mathematically as follows:

$$position(t_m) = position(t_k) + deltaposition(t_k, t_m)$$

where position($t_k$) is the position computed for time $t_k$; and position($t_m$) is the position for time $t_m$.

The above-described steps, i.e. "(step 1)" to "(step 4)", may be used to form delta-carrier-phase observables and generate corresponding delta-position estimates. Namely, as explained in relation to above-described "(step 1)", the delta-carrier-phase observables may be computed by subtracting carrier phase observables of an epoch, also hereinafter referred to as "anchor epoch", from carrier phase observables of the next epoch, also hereinafter referred to as "terminus epoch", and the anchor epoch may be incremented at each processing epoch. For an example of realization of such a way of forming delta-carrier-phase observables, see reference [4], FIG. 1 and p. 9 line 26 to p. 11 line 18 (in the description as filed), where that realization is referred to as "stepwise processing reference implementation". It will be simply referred to as "stepwise processing implementation" in the present document.

However, delta-carrier-phase observables need not necessarily be formed by incrementing the anchor epoch at each processing epoch. They may be formed in other ways.

For example, the anchor epoch may be updated at a fixed rate. For an example of realization of such a way of forming delta-carrier-phase observables, see reference [4], FIG. 2 and p. 11 line 19 to p. 12 line 22 (in the description as filed), where that realization is referred to as "preset anchor epoch reference implementation". It will be simply referred to as "preset anchor epoch implementation" in the present document.

In another example, forming delta carrier phase observables is carried out with the ability, in effect, to automatically adjust the anchor epoch update interval (i.e., the time interval at which the anchor epoch is updated). In other words, the anchor epoch may be shifted, i.e. increased, adaptively depending on various factors, such as current NSS-related tracking conditions. Examples of realizations of this way of forming delta-carrier-phase observables are schematically illustrated and described in reference [4], see—among other parts—FIGS. 3a, 3b, 3c, 4a, 4b, and 12, and p. 12 line 26 to p. 20 line 28, p. 27 line 23 to p. 28 line 1, and p. 39 line 1 to p. 40 line 17 in the description as filed. These realizations will be collectively referred to as "adaptive delta-phase anchor setting implementations" in the present document.

The forming of delta carrier phase observables in the present invention is not limited to any of the above-referred implementations. That is, forming delta carrier phase observables in embodiments of the present invention may be carried out in accordance with, but without being limited thereto, any one of, or any combination of, a stepwise processing implementation, a preset anchor epoch implementation, and an adaptive delta-phase anchor setting implementation.

FIG. 1 is a flowchart of a method in one embodiment of the invention. The method may be carried out by a NSS receiver configured for observing NSS signals from a plurality of NSS satellites over multiple epochs, by another processing entity capable of receiving data from the NSS receiver, or by an NSS receiver in conjunction with such other processing entity (i.e., by an NSS receiver and another processing entity). The processing entity may be located remotely from the NSS receiver and may, for example, receive data representing the NSS observations from the NSS receiver.

In one embodiment, the method aims at estimating parameters derived from NSS signals useful to, i.e. suitable to, determine (i.e., estimate) a position, such as a position of a rover receiver (also called "rover system" or simply "rover") or of a reference station. The method may eventually lead to estimating a rover position or reference station position. In one embodiment, the position is a position relative to a reference point or initial point, whose absolute position need not necessarily be precisely known, and the method may aim at estimating a trajectory relative to the reference point or initial point.

The estimated parameters may for example indicate the most probable number of carrier cycles along the distance separating an NSS satellite from the NSS receiver, i.e. the estimated parameters may be the resolved integer ambiguity (although this is not necessary, as explained below). This also means that the method may estimate the position itself but not necessarily: parameters may be estimated that may be used, for example by another entity (such as a processing entity on a server dedicated to such task), to estimate or determine the position of the NSS receiver (e.g., a rover receiver) or of a reference station. Furthermore, other parameters such as, for example, properties of the ionosphere may be estimated.

Indeed, if the position of both the NSS receiver and the plurality of NSS satellites are known, resolving the integer ambiguities may enable the determination of parameters affecting the transmission of the signals (or some components thereof) through the ionosphere or other parts of the atmosphere. Doing so is useful for example for generating a correction stream to be broadcasted to users (see e.g. references [5] and [6]).

Yet furthermore, beyond determining the position of a rover or a reference station, if the position of NSS receivers (such as reference stations) is known, solving the integer ambiguities in the carrier phases by solving observation equations may also be used to eventually estimate the position of a satellite.

However, in some embodiments, it is unnecessary to solve the integer ambiguities in the carrier phases because processing the delta-carrier-phase observables cancels out the integer ambiguities as explained above. Thus, in these embodiments, the parameters estimated by the method may instead be parameters representing a change in the NSS receiver position based on which a trajectory, i.e. a relative position over time, can be derived.

The application relying on NSS observations to produce an estimate of said parameters, or a combination thereof, may for example be a highly automated driving or autonomous driving application relying on NSS observations to produce an estimate of the position, velocity, or acceleration of a vehicle.

In step s10, time-differenced carrier phase observables, i.e. delta carrier phase observables, are computed, i.e. formed, by subtracting carrier phase observables of an epoch, hereinafter referred to as "anchor epoch", from carrier phase observables of a subsequent epoch, hereinafter referred to as "terminus epoch". In other words, time-differenced observables, i.e. delta observables, are computed by differencing NSS observables observed by the NSS receiver at the terminus epoch and observables observed by the NSS receiver at the anchor epoch preceding the terminus epoch, and the observables comprise at least carrier phase observables. In one embodiment, step s10 is initially performed only insofar as valid delta carrier phase observables can be formed. This means that initially any carrier phase observable affected by a cycle slip or any other change in phase ambiguity between the anchor epoch and the terminus epoch under consideration are excluded from the computation, i.e. when forming delta carrier phase observables. This also means initially excluding any new carrier phase observable, i.e. any carrier phase observable that was not available at all at the anchor epoch, because a new satellite and/or a new tracking band has been acquired in the meantime (i.e. between the anchor epoch and the terminus epoch).

When performing step s10, the delta-phase interval, which is the difference between the anchor epoch and the terminus epoch, may be equal to the measurement update interval or, if the delta carrier phase observables are not formed or not always formed in accordance with a stepwise processing implementation, to a multiple of the measurement update interval.

In one embodiment, the method is performed at the receiver epoch rate so that the measurement update interval is equal to the time interval between two successive receiver epochs. In another embodiment, the method is performed at a lower rate than the receiver epoch rate, which means computing the delta-carrier-phase observables at a lower rate than the receiver epoch rate, and this also means that the measurement update interval is a multiple of the time interval between two receiver epochs. In such a case, this may mean that the method does not use all the data collected at the NSS receiver. In one embodiment, the method is performed at a lower rate than the receiver epoch rate depending on a condition, such as a condition depending on the number of available satellites ("available" means here available from the perspective of the NSS receiver, i.e. satellites from which the NSS receiver can receive NSS signals). For example, the method may be configured to be performed at a lower rate than the receiver epoch rate if the number of available satellites is 6 or larger than 6. In another example, with a highly-inertial systems (e.g., a car or an airplane) and with high update rate (e.g., 100 Hz), the method may for example be performed at 10 Hz. In other words, the value of the measurement update interval may be adjusted depending on various pieces of information indicative of, for example, the state of the NSS or the state of the NSS receiver.

The measurement update interval may, in one embodiment, have a value that is larger than, or equal to, 0.1 second and smaller than, or equal to, 10 seconds, or, in one embodiment, a value that is larger than, or equal to, 0.1 second and smaller than, or equal to, 2 seconds, or, in a further embodiment, a value that is larger than, or equal to, 0.15 second and smaller than, or equal to, 0.5 second. A large value for the measurement update interval may increase the likelihood that satellite carrier phase observations tracked at the anchor epoch might no longer be tracked even initially at the end of the measurement update interval, i.e. at the terminus epoch. A small value for the measurement update interval increases the computation load in view of the larger number of delta-position estimates to be generated. A value for the measurement update interval that is larger than, or equal to, 0.15 second and smaller than, or equal to, 0.5 second may represent a preferable trade-off between these two aspects. However, as clear from the above, the invention is not limited to any specific measurement update interval.

Further, in the present document, the term "subsequent" in connection with "epoch" means, in one embodiment, "following in time". In another embodiment, the term means "following in order" with the epochs being ordered in reverse time and the method being performed at least partially in a post-processing manner (see discussion of the reverse-time, post-processing embodiment below).

In step s20, an estimation process, hereinafter referred to as "estimator", is operated for the terminus epoch. The estimator uses state variables and computes values of its state variables at least based on the computed delta carrier phase observables (i.e., computed in step s10). Here, operating the estimator "for the terminus epoch" means that, when operated for the terminus epoch, the estimator outputs at least a positioning solution or positioning-related solution that is valid at the terminus epoch under consideration.

In one embodiment, the estimator computes a trajectory solution using NSS signals observed by the NSS receiver and more specifically using computed time-differenced carrier phase observables. By "trajectory", it is here meant a change in position over time with respect to a reference position. An estimator computing a trajectory solution using delta carrier phase observables is advantageous in terms of implementation notably because it may involve a relatively small number of states, i.e. a relatively small number of state variables, and because position increments are computed based on carrier phase observables (which are known to yield a more precise positioning solution than code observables) without having to resolve the integer ambiguities in the carrier phases.

The estimator is or comprises an algorithm, procedure, or process, or a piece of software, firmware, and/or hardware configured for implementing such an algorithm, procedure, or process, in which a set of state variables (or "state vector") is maintained over time, i.e. the values of the state variables are estimated based on measurements made over time. The measurements may comprise data representing the observed NSS signals. The estimator involves or comprises, in one embodiment, a Kalman filter, a least mean squares (LMS) estimator, and/or a robust estimator. In one embodiment, the estimator involves an LMS estimator with memory. In another embodiment, the estimator involves an LMS estimator without memory, i.e. an LMS estimator in which LMS estimates are computed independently per epoch. The invention is, however, not limited to the use of Kalman filter(s), LMS estimator(s), and/or robust estimator(s). Other estimation processes, filters, or filter techniques may be used.

The estimator's state variables may represent, for example, the position of the NSS receiver, an offset in the position of the NSS receiver relative to another position (the offset per se being therefore a relative position), an offset in the position of the NSS receiver relative to another epoch, the rate of change of the position, the rate of change of the offset in the position, a bias related to the NSS receiver, a bias related to any of the NSS satellites, a bias related to any of the satellite systems, a bias related to any of the NSS signals, the rate of change of any of the said biases, or any combination of the above.

In step s30a, a synthetic carrier phase observable for the anchor epoch is generated for each of at least one carrier phase observable of the terminus epoch for which a change in phase ambiguity has been determined to have occurred with respect to the corresponding carrier phase observable of the anchor epoch.

Here, the term "synthetic" refers, as explained above, to a carrier phase observable that is not observed by the NSS receiver at an epoch under consideration but that is computed, i.e. estimated.

Further, generating a synthetic carrier phase observable "for the anchor epoch" within the context of step s30a means that the synthetic carrier phase observable is generated to constitute an estimation of the carrier phase observable as it would have been observed at the anchor epoch by the NSS receiver if there had been no change in phase ambiguity.

Considering a carrier phase observable, a change in phase ambiguity may be determined to have occurred between the anchor epoch and the terminus epoch in different ways. For example, a first way is to use the receiver tracking loop, and a second is to use outlier detection methods.

In the case of the receiver tracking loop, cycle slips and other types of change in phase ambiguity are typically flagged if the signal power disappears. Specifically, if alignment between the locally generated carrier signal and received signal cannot be maintained to within sufficient accuracy, as measured by the in-phase (I) and quadrature-phase (Q) correlators, then a cycle slip is declared. This process, which is known to the persons skilled in the art, may also be regarded as constituting an outlier detection in the receiver tracking loop (Details of carrier phase and code tracking loops can be found for example in reference [9], sections 9.4-9.7).

The second method is to apply outlier detection methods within estimation step s20. Given that delta-carrier-phase measurements have millimeter-level precision, a cycle error that is larger than, or equal to, 1 (one) in one of the delta-carrier phase measurements will be readily identifiable (assuming that there are enough valid observations). Outlier detection identification methods are well established for least-squares, Kalman filtering and robust estimation. The determination that a change in phase ambiguity has occurred may, in one embodiment, be performed when, or prior to, carrying out step s10. This is because, as explained above, step s10 may, in one embodiment, be initially performed only insofar as valid delta carrier phase observables can be formed. That is, it may be desirable to identify carrier phase observables that are cycle-slipped or otherwise affected by a change in phase ambiguity before step s10 so as not to use these carrier phase observables in step s10. Forming delta carrier phase observables based on carrier phase observables that are cycle-slipped or otherwise affected by a change in phase ambiguity may affect the validity of the delta carrier phase observables thus formed.

However, in another embodiment, all carrier phase observables, whether cycle-slipped or not (or, more generally, whether affected by a change in phase ambiguity or not), may be included when forming delta carrier phase observables in step s10, and outlier detection methods (for Kalman filtering, see for example reference [10]; for robust estimation, reference [7], for example, describes how outliers can be detected and handled) may then be used to identify and potentially repair cycle-slipped observables (in that respect, see for example reference [10], section 5 titled "Adaptation", which describes how outliers can be identified and then estimated). In such an embodiment, the determination that a change in phase ambiguity has occurred in relation to a carrier phase observable may thus be performed when, or prior to, carrying out step s30 but after carrying out step s10.

An example of change in phase ambiguity is a cycle slip. In common usage, the term "cycle slip" is often used by the persons skilled in the art to refer to a change in phase ambiguity that occurs when a locally generated carrier signal generated within a receiver fails to remain locked to the corresponding incoming received carrier signal. The incoming and locally generated carrier signals are typically aligned via a phase locked loop (PLL). In other words, in common usage, the term "cycle slip" refers to a change in the integer phase ambiguity that results from a temporary interruption of carrier tracking leading to a change in the integer cycle ambiguity term.

Some embodiments of the invention are not, however, limited to identifying cycle slips but also cover identifying any other types of change in phase ambiguity, such as those resulting from a complete loss of signal for one or more data epochs. In fact, the term "cycle slip" is sometimes also considered, more generally, to cover these other types of change in phase ambiguity when they are caused by a loss in PLL tracking. The cause of a cycle slip may for example include: signal attenuation caused by a physical obstruction, interference, or jamming. Any determination that a carrier phase observable is phase discontinuous from the receiver's perspective may constitute a determination that a change in phase ambiguity has occurred between the carrier phase observable at the anchor epoch and the corresponding carrier phase observable of the terminus epoch. A phase discontinuity or change in phase ambiguity is a change in the integer cycle phase ambiguity.

In step s40, at least one generated synthetic carrier phase observable is used to compute delta carrier phase observables between the anchor epoch and at least one epoch subsequent to the terminus epoch. Namely, a delta carrier phase observable is computed, i.e. formed, by subtracting the synthetic carrier phase observable of the anchor epoch, i.e. generated for the anchor epoch in step s30a, from a carrier phase observable of an epoch subsequent to the terminus epoch.

In one embodiment, the method further comprises operating, for the at least one epoch subsequent to the terminus epoch (i.e., the at least one subsequent epoch referred to in step s40), the estimator, and the estimator computes values of its state variables at least based on the computed delta carrier phase observables between the anchor epoch and the at least one epoch subsequent to the terminus epoch. In other words, for the epoch subsequent to the terminus epoch, which may be the next epoch or an epoch after the next, the estimator uses the synthetic carrier phase observable for computing and outputting a positioning or positioning-related solution.

FIG. 2 is a flowchart of a method in one embodiment of the invention, which differs from FIG. 1 in that step s30a has been replaced with step s30b. In step s30b, a synthetic carrier phase observable for the anchor epoch is generated for each of at least one carrier phase observable of the terminus epoch for which, at the anchor epoch, no corresponding carrier phase observable was tracked. This happens when a NSS receiver starts tracking, at some point in time between the anchor epoch and the terminus epoch, one or more carrier phase observables from newly acquired satellites and/or one or more carrier phase observables associated with newly acquired frequency bands from a satellite.

Here, the term "synthetic" again refers to a carrier phase observable that is not observed by the NSS receiver at an epoch under consideration but that is computed, i.e. estimated.

Further, generating a synthetic carrier phase observable "for the anchor epoch" within the context of step s30b means that the synthetic carrier phase observable is generated to constitute an estimation of the carrier phase observable as it would have been observed at the anchor epoch if the NSS receiver had been able to acquire and track the observable.

Steps s10, s20, and s40 of the embodiments illustrated in FIGS. 1 and 2, respectively, are identical, so that the above description of steps s10, s20, and s40 applies equally to these embodiments.

FIG. 3 is a flowchart of a method in one embodiment of the invention, which combines the operations described with reference to FIGS. 1 and 2. That is, the method of FIG. 3 identifies both (i) the carrier phase observables of the terminus epoch for which a change in phase ambiguity has been determined to have occurred with respect to the corresponding carrier phase observable of the anchor epoch, and (ii) the carrier phase observables of the terminus epoch for which, at the anchor epoch, no corresponding carrier phase observable was tracked. And, for both, a synthetic carrier phase observable for the anchor epoch is generated.

In both steps 30a and 30b (the present considerations being therefore applicable to each of FIGS. 1 to 3 individually and collectively), a synthetic carrier phase observable may, in one embodiment, be generated by comparing the observed delta-carrier-phase measurement with its corresponding value computed from a change in estimated receiver position. The synthetic carrier phase observable may then be computed under the assumption that the observed and computed delta-phase measurements are equal. In contrast, prior art cycle slip repair is usually performed by resetting the corresponding carrier phase ambiguity term in an estimator.

The embodiments described with reference to FIGS. 1 to 3, all including the potential generation of one or more synthetic carrier phase measurements for the anchor epoch, have the advantage of maintaining accuracy, integrity, and availability of delta-position estimation, especially during periods of changing measurement geometry. By "integrity", the consistency between reported precisions and estimated position quantities is here meant. It is desirable that the precisions match the distribution of position errors. If the position errors are much greater than the reported precisions, then the solution integrity is poor. In order to maintain integrity, it is therefore desirable to have enough observations to ensure a sufficient level of overdetermination. The solution accuracy, integrity and availability generally approach 0 (zero) when the number of delta-carrier-phase observations is smaller than 4 (four).

Without the generation and injection of synthetic carrier phase measurement(s), there would be a reduction in the number of delta-carrier-phase measurements formed and this may weaken and potentially destabilize the estimated position states. In addition, generating a synthetic carrier phase observable for the anchor epoch allows to generally ensure that there is consistency in the receiver clock and all common biases to the same point in time, and this may be achieved using a relatively simple, and therefore computationally efficient, estimator state vector which may include position and a single receiver clock term. Alternatively, i.e. without generating synthetic carrier phase observable(s), it would in principle be possible—though potentially burdensome and computationally onerous—to allocate (in the estimator) and estimate additional state parameters to model the temporal variation of the receiver clock term, and additional state parameters to model receiver temperature-dependent radio frequency (RF) filter delays, antenna cable biases etc. Assuming that a NSS receiver employs a temperature-compensated crystal oscillator (TCXO) then the NSS receiver clock stability is typically in the range of 0.1 to 2 ppm. With a 2 ppm clock drift and a maximum satellite Doppler shift of 5 KHz, an error of $2 \times 10^{-6} \times 5000 = 0.01$ cycles typically accrues in delta-carrier-phase measurements every second. As long as all delta-carrier phase observations are anchored to the same time (which is made possible thanks to synthetic carrier phase observable(s) generated in embodiments of the invention), then the receiver clock and biases at the anchor epoch match those of the terminus epoch and therefore can be estimated simultaneously, without having to allocate additional state parameters (i.e., state variables) in the estimator. This is beneficial in terms of computational efficiency, as explained above, and also, in turn, in terms of saving battery power and/or battery size.

Although not illustrated in FIGS. 1, 2, and 3, steps s30a and s30b (steps s30a and s30b being hereinafter sometimes referred to collectively and individually as "step s30" for the sake of conciseness) may be preceded by a step of determining whether there is any carrier phase observable (i) for which a change in phase ambiguity has been determined to have occurred with respect to the corresponding carrier phase observable of the anchor epoch, or (ii) for which, at the anchor epoch, no corresponding carrier phase observable was tracked. If there is no such carrier phase observable satisfying (i) or (ii) (meaning that there is currently no significant change in satellite measurement geometry), step s30 may be skipped. In other words, step s30 may be performed conditionally depending on the outcome of a determination. In that respect, see also step 330 of FIG. 4, that step being an example of such a determination.

In one embodiment (which may be referred to as "out-of-estimator generation embodiment"), a synthetic carrier phase observable for the anchor epoch is generated s30 based on the corresponding carrier phase observable at the terminus epoch; and an estimated change in range from the NSS receiver to a NSS satellite from which the carrier phase observable under consideration originates, from the anchor epoch to the terminus epoch. This embodiment is advantageous in that the synthetic carrier phase observable for the anchor epoch is generated in a separate step outside of the estimator, e.g. a Kalman filter, that is being used to estimate the state vector (denoted below as $\hat{x}$).

In a sub-embodiment of the above-referred out-of-estimator generation embodiment, a synthetic carrier phase observable for the anchor epoch is generated s30 is further based on: values of the estimator's state variables computed for the terminus epoch; and a plurality of direction cosines, applicable at the terminus epoch, for a range from the NSS receiver to the NSS satellite from which the carrier phase observable under consideration originates. This sub-embodiment is based on linearized model. In section D.1 below (including especially Eq. (21)), a possible implementation of this sub-embodiment will be explained in more detail.

In a sub-embodiment of the above-referred out-of-estimator generation embodiment, a synthetic carrier phase observable for the anchor epoch is generated s30 is further based on: an estimated change in the NSS receiver's clock error, from the anchor epoch to the terminus epoch. This sub-embodiment is based on non-linear model. In section D.2 below (including especially Eq. (25)), a possible implementation of this sub-embodiment will be explained in more detail.

In one embodiment (which may be referred to as "in-estimator generation embodiment"), a synthetic carrier phase observable for the anchor epoch is generated s30 by: allocating, in the estimator, an additional state to the synthetic carrier phase observable for the anchor epoch; and generating the synthetic carrier phase observable for the anchor epoch as part of the operating of the estimator for the terminus epoch (thus meaning that steps s20 and s30 are performed in parallel). In this embodiment, an arbitrarily large (for example $1 \times 10^{20}$ m$^2$) initial variance may be assigned to the additional state for the synthetic carrier phase observable. This additional state is then estimated at the same time as the other position-related parameters. More specifically, the additional state(s) for the synthetic anchor observation(s) are allocated prior to running the observation update of the estimator. Once the estimator is updated, the synthetic anchor observation value(s) and all other state parameters are known. Once estimated, the additional state may be moved out of the state vector and applied to subsequent observations on the corresponding carrier phase observable. The in-estimator generation embodiment is mathematically rigorous given that the correlations between synthetic anchor observation and all other states is automatically established. Moreover, the precisions of the synthetic anchor observations are readily obtained from the diagonal elements of the a-posteriori state covariance matrix. However, this approach may, under certain circumstances and to a certain (limited) extent, suffer from the disadvantage of computational complexity that arises from expanding the number of estimated state parameters.

In one embodiment, the method is performed at least partially as part of a data post-processing process. In other words, the invention is not limited to a real-time operation. Rather, it may be applied for processing pre-collected data to determine a position, trajectory, or other information, in post-processing. For example, the observations may be retrieved from a set of data which was previously collected and stored; the processing may be conducted for example in an office computer long after the data collection and thus not in real-time.

In one embodiment (which may be referred to as "reverse-time, post-processing embodiment"), the method is performed at least partially in a post-processing manner (as explained in the preceding paragraph), the term "subsequent" in connection with "epoch" means "following in order", and the epochs are ordered in reverse time. This reverse-time order means that the epoch's values are also increasing in reverse time, in accordance with the above-referred reverse time order, i.e. in a negative sense with respect to time. This embodiment reflects the possibility of running the method in reverse time. That is, for post-processing applications, the data, i.e. the carrier phase observables, can effectively be run backwards, and all of what is described in the present document can still be applied.

In one embodiment, the method is performed in both forward and reverse time post-processing. This is advantageous in that, in a forward processing run, it takes time to resolve integer carrier phase ambiguities immediately following some tracking interruption, such as that caused by an overpass. These data segments can often be populated with integer resolved solutions when processing in reverse time.

In one embodiment of the invention (not illustrated in the drawings), the method described with reference to any one of FIGS. 1, 2, and 3, comprises a step of observing NSS signals. That is, in this embodiment, steps s10, s20, s30 (i.e., step s30a, step s30b, or both) and s40 are carried out at least by an NSS receiver, and the NSS receiver also observes NSS signals.

In another embodiment of the invention (not illustrated in the drawings), an NSS receiver observes NSS signals and the NSS receiver transmits data representing the observed NSS signals, or information derived therefrom, to another processing entity or set of processing entities in charge of carrying out steps s10, s20, s30, and s40, which then receives the data representing the observed NSS signals, or information derived therefrom.

The data representing the observed NSS signals, or information derived therefrom, may for example be transmitted from the NSS receiver in the form of data packets, such as IP packets, through, for example, any one of, or a combination of, the Internet, a cellular network, and a suitable satellite link. The skilled person would, however, appreciate that other forms of wired or wireless transmission may be used, such as, and without being limited to, wireless transmissions based on Bluetooth, Wi-Fi, or Li-Fi. In one embodiment, the data representing the observed NSS signals is transmitted in real-time, i.e. as soon as available (in line with the above-mentioned definition of the term "real-time"). In one embodiment, the data representing the observed NSS signals is transmitted as a data stream in that messages containing said data are transmitted at regular or irregular intervals through the same communication medium or channel. The data representing the observed NSS signals may be encoded and/or encrypted prior to transmission.

In one embodiment, steps s10 to s40 may be repeated. In such a manner, delta carrier phase observables may be repeatedly formed over time with the same anchor epoch, wherein step s10 of a given iteration incorporates the synthetic carrier phase observable generated in the previous iteration. In other words, when the same anchor epoch is used over several iterations and the terminus epoch is incremented at each iteration (for example in accordance with a preset anchor epoch implementation or an adaptive delta-phase anchor setting implementation, as discussed above), a synthetic carrier phase observable may be repeatedly generated, with the older value being overwritten, i.e. replaced with, the newer value. The number of iterations may be a preset number. Alternatively, the number of iterations may be determined in runtime. For example, the method may be performed as long as a vehicle is moving in order to determine its position along the trajectory it takes.

Before discussing further embodiments of the invention, let us now further explain, in sections A to C below, the context in which some embodiments of the invention have been developed, for a better understanding thereof, as well as some technical considerations that may be helpful for understanding some embodiments of the invention and problems addressed by these embodiments.

A. GNSS Observation Models

Carrier phase measurements comprise the difference between a NSS receiver-generated carrier signal and the carrier signal received from a satellite, at an epoch t. A suitable carrier phase measurement model is given by:

$$\phi_b^k(t) = \rho^k(t) + Y^k(t) + T(t) + \qquad \text{(Equation 1)}$$

$$\beta_b(t) - I_b^k(t) + \tau^k(t) + m_b^k(t) + \lambda_b N_b^k(t) + \epsilon_b^k(t)$$

where:

k refers to a satellite;

b refers to a tracking frequency band (e.g. GPS L1C/A, GPS L5, Galileo E5-AltBOC, etc.);

t refers to an epoch, i.e. a point in time;

$$\phi_b^k(t)$$

is a carrier phase measurement collected by a NSS receiver to satellite k, on band b, recorded at epoch t (units: meter);

$\rho^k(t)$ denotes a geometric range term (units: meter) and is given as $\sqrt{[x^k(t)-x(t)]^2+[y^k(t)-y(t)]^2+[z^k(t)-z(t)]^2}$, wherein $[x^k(t), y^k(t), z^k(t)]$ are the satellite coordinates at a corresponding signal transmit time and $[x(t), y(t), z(t)]$ are the NSS receiver coordinates;

$\gamma^k(t)$ denotes a satellite clock error (units: meter);

T(t) denotes a receiver clock error (units: meter); T(t)

$\beta_b(t)$ denotes a receiver carrier-phase hardware bias term (units: meter);

$$I_b^k(t)$$

denotes a frequency-dependent ionospheric phase advance term (hence the negative sign in Equation 1) (units: meter);

$\tau^k(t)$ denotes a tropospheric bias term (units: meter);

$$m_b^k(t)$$

denotes a carrier phase multipath error (units: meter);

$$N_b^k(t)$$

denotes an integer carrier phase ambiguity term (units: cycles);

$\lambda_b$ denotes a carrier wavelength for band b (units: meter); and $$\epsilon_b^k(t)$$

denotes a random carrier phase error term (units: meter).

The measurement model is presented for a single receiver. However, it is also applicable to single-differenced data, formed by the combination of rover observations, plus corrections derived from any one of: a physical reference (base) receiver; a network of reference receivers; a virtual reference station; and a regionally augmented, or global precise point positioning (PPP) network.

Carrier phase measurements are typically recorded on all satellite tracking channels simultaneously, at an epoch interval of, for example, 0.1 second, that is, at a 10 Hz rate. Differentially corrected carrier phase measurements are routinely used for high-precision real-time kinematic (RTK) and PPP applications. Differential corrections reduce the magnitude of satellite orbit and satellite clock errors, and atmospheric errors.

Carrier phase measurements have millimeter-level precision but suffer from the various bias errors outlined in Equation 1 above. In particular, the integer carrier phase ambiguity term represents a bias of many meters that should be resolved in order to achieve centimeter-level positioning accuracies.

Ionospheric and tropospheric errors can be on the order of many meters for a single NSS receiver but are reduced by several orders of magnitude when using differential techniques.

B. GNSS Delta-Phase Measurements

Delta-phase measurements, also called "delta-carrier-phase measurements", are formed by differencing in time carrier phase measurements of a NSS receiver, measured to a single satellite, on a single tracking band:

$$\delta\phi_b^k(t_1, t_2) \equiv \phi_b^k(t_2) - \phi_b^k(t_1) \qquad \text{(Eq. 2)}$$

The sign "≡" means "is equal by definition" or "is defined as".

Let $t_1$ be referred to as the anchor epoch, i.e. the epoch at which a delta-phase measurement is anchored. The delta-phase measurement model is given by:

$$\delta\phi_b^k(t_1, t_2) = \delta\rho^k(t_1, t_2) + \delta Y^k(t_1, t_2) + \delta T(t_1, t_2) - \qquad \text{(Eq. 3)}$$
$$\delta I_b^k(t_1, t_2) + \delta\tau^k(t_1, t_2) + \delta m_b^k(t_1, t_2) + \delta\epsilon_b^k(t_1, t_2)$$

where:

$$\delta\phi_b^k(t_1, t_2)$$

denotes a delta-phase measurement between epochs $t_1$ and $t_2$ to satellite k on band b;

$\delta\rho^k(t_1,t_2)$ denotes a delta geometric range term $\rho^k(t_2)-\rho^k(t_1)$ containing the change in position of the rover receiver between epochs $t_1$ and $t_2$;

$\delta Y^k(t_1,t_2)$ denotes a change in satellite clock error;

$\delta T(t_1,t_2)$ denotes a change in receiver clock error;

$$\delta I_b^k(t_1, t_2)$$

denotes a change in ionospheric phase advance;

$\delta\tau^k(t_1,t_2)$ denotes a change in tropospheric error;

$$\delta m_b^k(t_1, t_2)$$

denotes a change in carrier phase multipath; and $$\delta\epsilon_b^k(t_1, t_2)$$

denotes a delta-phase random error term.

The carrier phase ambiguity term is absent from Equation 3, since it is a constant for continuously tracked measurements and therefore differences away. Similarly, the receiver hardware bias term $\beta_b(t)$ can be assumed to be constant, or virtually so over short time intervals and therefore it differences away in Equation 3. NSS satellite atomic clocks are very stable—clock correction models are provided via broadcast ephemerides, or PPP services. Therefore, the satellite clock drift terms $\gamma^k(t)$ can be assumed to be known and/or pre-corrected.

The ionospheric phase advance term $$\delta I_b^k(t_1, t_2)$$

is frequency-dependent and can be removed via the use of multi-band ionospheric-free observations. With single-difference observations collected over short (i.e. smaller than 20 km) reference (base) receiver to rover receiver separation, the ionospheric error changes by just a few millimeters per second and can therefore be treated as a random error source. Under scintillation conditions, the ionospheric error may fluctuate by several cycles per second. Fortunately, ionospheric scintillation is mostly confined to the equatorial anomaly and polar regions of the Earth, during periods of elevated solar activity.

Under stable weather conditions, the tropospheric delay generally changes by just a few millimeters per minute. Moreover, the dry component of the tropospheric delay can be adequately removed via the application of conventional models (see e.g. reference [9], p. 148). The change in tropospheric error $\delta\tau^k(t_1,t_2)$ can therefore be corrected for, or largely ignored.

Carrier phase multipath can change by multiple centimeters per second, particularly under dynamic tracking conditions such as that experienced by vehicles traveling at speed on a highway. When the rover (i.e., the NSS receiver) is static, multipath generally changes slowly, for example, at a rate of 2 mm per second. Rather than estimate the carrier phase multipath error, it can be treated as a random error and be absorbed into $$\delta\epsilon_b^k(t_1, t_2),$$

via an inflation of the variance assigned to delta-phase measurements.

Under the assumptions outlined above, it is possible, without substantial loss of accuracy, to reduce the delta-phase measurement model of Equation 3 to the following simplified form:

$$\delta\phi_b^k(t_1, t_2) = \delta\rho^k(t_1, t_2) + \delta T(t_1, t_2) + \delta\epsilon_b^k(t_1, t_2) \qquad \text{(Eq. 4)}$$

where $\delta\rho^k(t_1,t_2)$ denotes a geometric range term given as $$\sqrt{\begin{array}{c}[\delta x^k(t_1, t_2) - \delta x(t_1, t_2)]^2 + [\delta y^k(t_1, t_2) - \delta y(t_1, t_2)]^2 + \\ [\delta z^k(t_1, t_2) - \delta z(t_1, t_2)]^2\end{array}}$$

where:

$[\delta x^k(t_1,t_2), \delta y^k(t_1,t_2), \delta z^k(t_1,t_2)]$ denotes a change in satellite signal transmit-time coordinates between epochs $t_1$ and $t_2$:

$$\delta x^k(t_1, t_2) = x^k(t_2) - x^k(t_1)$$

$$\delta y^k(t_1, t_2) = y^k(t_2) - y^k(t_1)$$

$$\delta z^k(t_1, t_2) = z^k(t_2) - z^k(t_1)$$

$[\delta x(t_1,t_2), \delta y(t_1,t_2), \delta z(t_1,t_2)]$ denotes a change in receiver coordinates between epochs $t_1$ and $t_2$:

$$\delta x(t_1, t_2) = x(t_2) - x(t_1)$$

$$\delta y(t_1, t_2) = y(t_2) - y(t_1)$$

$$\delta z(t_1, t_2) = z(t_2) - z(t_1)$$

Least squares estimation or Kalman filtering require linear relationships between the observations and the unknown parameters. Therefore, if a least squares estimation or Kalman filtering is used, it is desirable to linearize Equation 4 using first-order terms of a Taylor's series:

$$\delta\phi_b^k(t_1, t_2) = \underline{\delta\rho}^k(t_1, t_2) + \frac{x^k(t_2) - x(t_2)}{\underline{\rho}^k(t_2)}\Delta x(t_2) + \quad \text{(Eq. 5)}$$
$$\frac{y^k(t_2) - y(t_2)}{\underline{\rho}^k(t_2)}\Delta y(t_2) + \frac{z^k(t_2) - z(t_2)}{\underline{\rho}^k(t_2)}\Delta z(t_2) - \frac{x^k(t_1) - x(t_1)}{\underline{\rho}^k(t_1)}\Delta x(t_1) +$$
$$\frac{y^k(t_1) - y(t_1)}{\underline{\rho}^k(t_1)}\Delta y(t_1) + \frac{z^k(t_1) - z(t_1)}{\underline{\rho}^k(t_1)}\Delta z(t_1) + \delta T(t_1, t_2) + \delta\epsilon_b^k(t_1, t_2)$$

where:

$(\cdot)$ denotes a quantity computed based on approximate rover coordinates $[\underline{x}(t_1), \underline{y}(t_1), \underline{z}(t_1)]$ at $t_1$, and $[\underline{x}(t_2), \underline{y}(t_2), \underline{z}(t_2)]$ at $t_2$;

$$\frac{x^k(t_2) - x(t_2)}{\underline{\rho}^k(t_2)}; \frac{y^k(t_2) - y(t_2)}{\underline{\rho}^k(t_2)}; \frac{z^k(t_2) - z(t_2)}{\underline{\rho}^k(t_2)}$$

represent the direction cosines for the rover-satellite ranges, expanded in terms of the approximate rover coordinates;

$\Delta x(t_1), \Delta y(t_1), \Delta z(t_1)$ denotes estimated correction terms to the approximate rover coordinates at epoch $t_1$; and $\Delta x(t_2), \Delta y(t_2), \Delta z(t_2)$ denotes estimated correction terms to the approximate rover coordinates at epoch $t_2$.

On the right-hand side of above Equation 5, the term in the first line denotes an approximate change in user-satellite geometric range, the term in the second line denotes corrections to user position at epoch $t_2$, the term in the third line denotes corrections to user position at epoch $t_1$, the term in the fourth line denotes a change in receiver clock error, and the term in the fifth (last) line denotes a random noise term.

Let $\Lambda^k(t_1)$ be the direction cosine terms for the rover-satellite ranges at epoch $t_1$:

$$\Lambda^k(t_1) = \left[\frac{x^k(t_1) - x(t_1)}{\underline{\rho}^k(t_1)}; \frac{y^k(t_1) - y(t_1)}{\underline{\rho}^k(t_1)}; \frac{z^k(t_1) - z(t_1)}{\underline{\rho}^k(t_1)}\right]$$

and for epoch $t_2$:

$$\Lambda^k(t_2) = \left[\frac{x^k(t_2) - x(t_2)}{\underline{\rho}^k(t_2)}; \frac{y^k(t_2) - y(t_2)}{\underline{\rho}^k(t_2)}; \frac{z^k(t_2) - z(t_2)}{\underline{\rho}^k(t_2)}\right]$$

Using the abbreviated expressions for the direction cosines, and shifting the approximate computed delta-range term onto the left-hand side, leads to a more succinct form of Equation 5:

$$\delta\phi_b^k(t_1, t_2) - \underline{\delta\rho}^k(t_1, t_2) = \Lambda^k(t_2) \circ [\Delta x(t_2), \Delta y(t_2), \Delta z(t_2)]' - \quad \text{(Eq. 6)}$$
$$\Lambda^k(t_1) \circ [\Delta x(t_1), \Delta y(t_1), \Delta z(t_1)]' + \delta T(t_1, t_2) + \delta\epsilon_b^k(t_1, t_2)$$

Rather than estimating the current and previous rover positions, the change in rover position between epochs $t_1$ and $t_2$ can be directly estimated, in which case the linearized measurement model becomes:

$$\delta\phi_b^k(t_1, t_2) = \quad \text{(Eq. 7)}$$
$$\underline{\delta\rho}^k(t_1, t_2) + \frac{x^k(t_2) - x(t_2)}{\underline{\rho}^k(t_2)}\Delta\delta x(t_1, t_2) + \frac{y^k(t_2) - y(t_2)}{\underline{\rho}^k(t_2)}\Delta\delta y(t_1, t_2) +$$
$$\frac{z^k(t_2) - z(t_2)}{\underline{\rho}^k(t_2)}\Delta\delta z(t_1, t_2) + \delta T(t_1, t_2) + \delta\epsilon_b^k(t_1, t_2),$$

On the right-hand side of above Equation 7, the term in first line denotes an approximate change in user-satellite geometric range, the terms in the second line denote corrections to delta-position at epoch $t_2$, the term in the third line denotes a change in receiver clock error, and the term in the fourth (last) line denotes random noise term.

Expressing Equation 7 in terms of the direction cosine vector $\Lambda^k(t_2)$, and shifting $\underline{\delta\rho}^k(t_1,t_2)$ to the left-hand side, leads to:

$$\delta\phi_b^k(t_1, t_2) - \underline{\delta\rho}^k(t_1, t_2) = \quad \text{(Eq. 8)}$$
$$\Lambda^k(t_2) \circ [\Delta\delta x(t_1, t_2), \Delta\delta y(t_1, t_2), \Delta\delta z(t_1, t_2)]' + \delta T(t_1, t_2) + \delta\epsilon_b^k(t_1, t_2)$$

C. Estimation

Gathering the parameters of interest in Equation 6 leads to the following state vector definition:

$$x = [x(t_2), y(t_2), z(t_2) | x(t_1), y(t_1), z(t_1) | \delta T(t_1, t_2)]' \quad \text{(Eq. 9)}$$

where [ . . . ]' denotes a vector/matrix transposition and:
$x(t_2), y(t_2), z(t_2)$ denotes the current position;
$x(t_1), y(t_1), z(t_1)$ denotes the anchor position; and
$\delta T(t_1,t_2)$ denotes the delta clock.

The state vector for the model of Equation 8 is given by:

$$x = [\Delta\delta x(t_1, t_2), \Delta\delta y(t_1, t_2), \Delta\delta z(t_1, t_2) \mid \delta T(t_1, t_2)]' \qquad \text{(Eq. 10)}$$

where:

$\Delta\delta x(t_1,t_2), \Delta\delta y(t_1,t_2), \Delta\delta z(t_1,t_2)$ denotes the delta position; and $\Delta T(t_1,t_2)$ denotes the delta clock.

The linearized measurement models of Equations 6 and 8 can be written in vector/matrix form as:

$$l + v = Ax \qquad \text{(Eq. 11)}$$

where:

l denotes a (m×1) vector of delta-phase observations minus their computed equivalents;

A denotes a (m×n) coefficient matrix containing measurement partial derivatives relating each delta-phase observation to the estimated parameters;

x denotes a (n×1) state vector containing the estimated parameters; and v denotes a (m×1) vector of measurement residuals, described stochastically via their covariance matrix R (m×m), where R is assumed to be a diagonal matrix.

Writing Equations 6 and 8 in the form of Equation 11, leads respectively to:

$$\left[\delta\phi_b^k(t_1, t_2) - \delta\underline{\rho}^k(t_1, t_2)\right] + \left[-\delta\epsilon_b^k(t_1, t_2)\right] = \left[\Lambda^k(t_1),\right. \qquad \text{(Eq. 12)}$$

$$\left.\Lambda^k(t_2), +1\right] \circ [x(t_2), y(t_2), z(t_2) \mid x(t_1), y(t_1), z(t_1) \mid \delta T(t_1, t_2)]'$$

$$\left[\delta\phi_b^k(t_1, t_2) - \delta\underline{\rho}^k(t_1, t_2)\right] + \left[-\delta\epsilon_b^k(t_1, t_2)\right] = \left[\Lambda^k(t_2),\right. \qquad \text{(Eq. 13)}$$

$$\left.+1\right] \circ [\Delta\delta x(t_1, t_2), \Delta\delta y(t_1, t_2), \Delta\delta z(t_1, t_2) \mid \delta T(t_1, t_2)]'$$

The method of least squares or robust estimation can be utilized in the estimation of the state vector parameters described above. In the case of method of least squares, the most probable estimate of the state vector is given by:

$$\hat{x} = (A'WA)^{-1}AWl \qquad \text{(Eq. 14)}$$

where the measurement weight matrix W is given by the inverse of the measurement noise covariance matrix:

$$W = R^{-1} \qquad \text{(Eq. 15)}$$

As implied by their name, robust estimation techniques are resilient to measurement outliers (see for example reference [7]) and are suitable for NSS applications where measurement outliers are common.

Alternatively, Kalman filtering techniques can be used to derive estimates of the state vector, in which case the temporal behavior of the state parameters can be described by the following linear dynamic model:

$$x(k) = \Phi(k - 1, k)x(k - 1) + w(k) \qquad \text{(Eq. 16)}$$

$$P(k) = \Phi(k - 1, k)P(k - 1)\Phi(k - 1, k)' + Q(k) \qquad \text{(Eq. 17)}$$

where:

x(k) denotes a (n×1) state vector at epoch k;

$\Phi(k-1,k)$ denotes a (n×n) state transition matrix from epoch k−1 to epoch k;

w(k) denotes (n×n) system driving noise, assumed to be zero-mean, uncorrelated in time and is described by the (n×n) system driving noise covariance matrix Q(k); and P(k) denotes a (n×n) state vector covariance matrix at epoch k.

When Kalman filtering techniques are employed, the state vector is typically expanded to include rover velocity and optionally rover acceleration parameters. The inclusion of an appropriate vehicle dynamic model helps to strengthen the estimation process. A detailed description of Kalman filtering techniques can be found in reference [8], including suitable dynamic models for GPS applications (see Chapter 11), these models being also suitable for GNSS applications, more generally.

Irrespective of the technique used, let the estimated state vector be denoted x, and its associated covariance matrix $\hat{P}$.

Let us now describe further embodiments of the invention, together with considerations regarding how these embodiments may be implemented, for example, by software, hardware, or a combination of software and hardware.

Carrier phase cycle slips frequently occur in many GNSS tracking environments. Any interruption to carrier phase tracking causes a discontinuity in the corresponding delta-carrier-phase measurements. The above-referred adaptive delta-phase anchor setting implementations may automatically adjust the anchor time, i.e. the anchor epoch, according to the prevailing carrier phase tracking conditions. Nevertheless, the incidence of cycle slips tends to degrade positioning accuracy, particularly in environments where cycle slips are frequent. The above-referred adaptive delta-phase anchor setting implementations may be further enhanced by the introduction of synthetic carrier phase observations, in accordance with embodiments of the invention as described in the present document. Embodiments of the invention as described in the present document may be used in combination with the above-referred adaptive delta-phase anchor setting implementations or may be used independently therefrom.

Let us now consider the following exemplary schedule of L1 carrier phase measurements collected over a 1-second period by a NSS receiver from a single satellite (GPS PRN 06):

TABLE 1

| Carrier phase tracking history for a NSS receiver tracking GPS PRN 06, on the L1 band (wherein "s" stands for "second"). | |
| --- | --- |
| Time [s] | Carrier phase measurement |
| 1.0 | $\phi_{L1}^{G6}(1.0)$ |
| 1.2 | $\phi_{L1}^{G6}(1.2)$ |
| 1.4 | Cycle slip |
| 1.6 | $\phi_{L1}^{G6}(1.6)$ |
| 1.8 | $\phi_{L1}^{G6}(1.8)$ |
| 2.0 | $\phi_{L1}^{G6}(2.0)$ |

A cycle slip occurred around time 1.4 s, leading to a missing epoch of carrier phase data. The discontinuity in carrier phase tracking on GPS 06 causes a corresponding break in the possible formation of delta-carrier-phase measurements. Assuming that the delta-phase anchor epoch is 1.0, then all carrier phase measurements for GPS 06 following epoch 1.4 will not be used to form delta-carrier-phase measurements until the anchor epoch is shifted.

Rather than just shifting the anchor epoch forward (as described in reference [4]), a synthetic carrier phase observation is introduced at the current anchor epoch, in order to bridge the cycle slip. This process re-establishes the formation of delta-carrier-phase measurements and therefore helps stabilize the delta-position estimation process henceforth.

TABLE 2

Carrier phase tracking history for a NSS receiver tracking
GPS PRN 06 on the L1 band. Delta-phase observations
shown after epoch 1.4 s, are based on a synthetic carrier
phase observation constructed for the anchor epoch.

| Time [s] | (Delta−) carrier phase measurement |
|---|---|
| 1.0 | $\phi_{L1}{}^{G6}(1.0)$ (epoch 1.0 being the anchor epoch) |
| 1.2 | $\delta\phi_{L1}{}^{G6}(1.0, 1.2)$ (with anchor epoch 1.0) |
| 1.4 | cycle slip |
| 1.6 | $\widehat{\delta\phi_{L1}^{G6}}(1.0, 1.6)$ (with synthetic anchor epoch 1.0) |
| 1.8 | $\widehat{\delta\phi_{L1}^{G6}}(1.0, 1.8)$ (with synthetic anchor epoch 1.0) |
| 2.0 | $\widehat{\delta\phi_{L1}^{G6}}(1.0, 2.0)$ (with synthetic anchor epoch 1.0) |

The construction, i.e. generation, of a synthetic carrier phase observation for the anchor epoch can be accomplished via a linearized observation equation (see equation (13) and section D.1 below), or via a non-linear observation equation (see equation (4) and section D.2 below).

D.1 Linearized Observation Equation Approach in Accordance with an Embodiment of the Invention Let us recall from Eq. (13) that the linearized delta-phase measurement model is given by:

$$\left[\delta\phi_b^k(t_1, t_2) - \underline{\delta\rho^k}(t_1, t_2)\right] + \left[-\delta\epsilon_b^k(t_1, t_2)\right] = \left[\Lambda^k(t_2), +1\right] \circ \tag{Eq. 13}$$

$$[\Delta\delta x(t_1, t_2), \Delta\delta y(t_1, t_2), \Delta\delta z(t_1, t_2) \mid \delta T(t_1, t_2)]' l + v = A*x$$

The presence of a cycle slip means that the carrier phase ambiguity term will not be removed when time-differencing carrier phase observations. Therefore, the left-hand side (LHS) part of Eq. (13) is augmented with the carrier phase ambiguity term $$\delta N_b^k(t_1, t_2)$$

(multiplied by $\lambda_b$, which is the carrier wavelength for band b):

$$\left[\delta\phi_b^k(t_1, t_2) - \lambda_b\delta N_b^k(t_1, t_2) - \underline{\delta\rho^k}(t_1, t_2)\right] + \left[-\delta\epsilon_b^k(t_1, t_2)\right] = \tag{Eq. 18}$$

$$\left[\Lambda^k(t_2), +1\right] \circ [\Delta\delta x(t_1, t_2), \Delta\delta y(t_1, t_2), \Delta\delta z(t_1, t_2) \mid \delta T(t_1, t_2)]'$$

where $$\delta N_b^k(t_1, t_2) = N_b^k(t_2) - N_b^k(t_1).$$

Expanding out the LHS of Eq. (18) with the phase measurements for the anchor and current time, and ignoring the measurement residual term, leads to:

$$\phi_b^k(t_2) - \phi_b^k(t_1) - \lambda_b\delta N_b^k(t_1, t_2) - \underline{\delta\rho^k}(t_1, t_2) = \left[\Lambda^k(t_2), \tag{Eq. 19}\right.$$

$$\left. +1\right] \circ [\Delta\delta x(t_1, t_2), \Delta\delta y(t_1, t_2), \Delta\delta z(t_1, t_2) \mid \delta T(t_1, t_2)]'$$

Using the example provided in Table 2, it is desirable to generate a synthetic L1 carrier phase measurement for GPS 06 at anchor time 1.0. The state parameters on the RHS of Eq. (19) are estimated at each epoch using all valid delta-phase observations, leading to $\hat{x}$ and covariance matrix $\hat{P}$. Therefore, rearranging Eq. (19) leads to:

$$\phi_{L1}^{G6}(t_1) + \lambda_{L1}\delta N_{L1}^{G6}(t_1, t_2) = \phi_{L1}^{G6}(t_2) - \left[\Lambda^k(t_2), +1\right] \circ \hat{x} - \widehat{\delta\rho^{G6}}(t_1, t_2) \tag{Eq. 20}$$

The synthetic carrier phase measurement for the anchor epoch can be written as:

$$\widehat{\phi_{L1}^{G6}}(t_1) = \phi_{L1}^{G6}(t_2) - \left[\Lambda^{G6}(t_2), +1\right] \circ \hat{x} - \widehat{\delta\rho^{G6}}(t_1, t_2) \tag{Eq. 21}$$

where:

$$\widehat{\phi_{L1}^{G6}}(t_1)$$

is the synthetic carrier phase measurement at the anchor epoch:

$$\widehat{\phi_{L1}^{G6}}(t_1) = \phi_{L1}^{G6}(t_1) + \lambda_{L1}\delta N_{L1}^{G6}(t_1, t_2);$$

$\widehat{\delta\rho^{G6}}(t_1, t_2)$ is the computed rover satellite geometric change in range based on the computed rover position; and $\Lambda^{G6}(t_2)$ is the vector of direction cosines for GPS satellite 06 at time $t_2$.

The estimation of the synthetic carrier phase measurement $$\widehat{\phi_{L1}^{G6}}(t_1)$$

also carries with it an uncertainty, obtained by projecting $\hat{P}$ into the direction of satellite GPS 06:

$$\sigma_{\widehat{\phi_{L1}^{G6}}(t_1)}^2 = \left[\Lambda^{G6}(t_2), +1\right] P \left[\Lambda^{G6}(t_2), +1\right]' + \sigma_{\phi_{L1}^{G6}(t_2)}^2 + \sigma_{\phi_{L1}^{G6}(t_1)}^2 \tag{Eq. 22}$$

With the synthetic carrier phase measurement $$\widehat{\phi_{L1}^{G6}}(t_1)$$

and its variance known, delta-phase measurements can be directly formed at subsequent epochs and used in conjunction with all other observed delta-phase measurements to estimate the state parameters.

D.2 Non-Linear Observation Equation Approach in Accordance with an Embodiment of the Invention The synthetic carrier phase observation for the anchor epoch may be generated via the non-linear delta-phase observation equation (4), using an analogous approach to that used above for the linearized observation equation:

$$\delta\phi_b^k(t_1, t_2) = \delta\rho^k(t_1, t_2) + \delta T(t_1, t_2) + \delta\epsilon_b^k(t_1, t_2) \qquad \text{(Eq. 4)}$$

Assuming that the change in user position is estimated, together with the change in receiver clock error, then Eq. (4) can be written as:

$$\widehat{\delta\phi}_{L1}^{G6}(1.0, 1.6) = \widehat{\delta\rho}^{G6}(1.0, 1.6) + \widehat{\delta T}(1.0, 1.6) \qquad \text{(Eq. 23)}$$

where the geometric range term $$\widehat{\delta\rho}^{G6}(1.0, 1.6) = \sqrt{\begin{array}{l}\left[\delta x^{G6}(1.0, 1.6) - \widehat{\delta x}(1.0, 1.6)\right]^2 + \\ \left[\delta y^{G6}(1.0, 1.6) - \widehat{\delta y}(1.0, 1.6)\right]^2 + \\ \left[\delta z^{G6}(1.0, 1.6) - \widehat{\delta z}(1.0, 1.6)\right]^2\end{array}}$$

wherein:

$[\delta x^{G6}(1.0,1.6), \delta y^{G6}(1.0,1.6), \delta z^{G6}(1.0,1.6)]$ is the change in GPS06 satellite signal transmit-time coordinates between epochs 1.0 and 1.6:

$$\delta x^{G6}(1.0, 1.6) = x^{G6}(1.6) - x^{G6}(1.0)$$

$$\delta y^{G6}(1.0, 1.6) = y^{G6}(1.6) - y^{G6}(1.0)$$

$$\delta z^{G6}(1.0, 1.6) = z^{G6}(1.6) - z^{G6}(1.0)$$

$[\widehat{\delta x}(1.0,1.6), \widehat{\delta y}(1.0,1.6), \widehat{\delta z}(1.0,1.6)]$ is the estimated change in receiver coordinates between epochs 1.0 and 1.6:

$$\widehat{\delta x}(1.0, 1.6) = \hat{x}(1.6) - \hat{x}(1.0)$$

$$\widehat{\delta y}(1.0, 1.6) = \hat{y}(1.6) - \hat{y}(1.0)$$

$$\widehat{\delta z}(1.0, 1.6) = \hat{z}(1.6) - \hat{z}(1.0)$$

By definition, the delta carrier phase observation from epoch 1.0 to epoch 1.6 is given by:

$$\delta\phi_{L1}^{G6}(1.0, 1.6) = \phi_{L1}^{G6}(1.6) - \phi_{L1}^{G6}(1.0) \qquad \text{(Eq. 24)}$$

Using (Eq. 24) in (Eq. 23) yields:

$$\widehat{\phi_{L1}^{G6}}(1.0) = \phi_{L1}^{G6}(1.6) - \widehat{\delta\rho}^{G6}(1.0, 1.6) - \widehat{\delta T}(1.0, 1.6) \qquad \text{(Eq. 25)}$$

Equation (25) thus provides a way to generate a synthetic carrier phase observation at epoch 1.0 based on the observed carrier phase at epoch 1.6, minus the estimated change in range and estimated change in clock error over the delta time interval (1.0,1.6).

E. Further Embodiments

FIG. 4 schematically illustrates a method in a further embodiment of the invention. Starting at (305), all delta-carrier phase observations are formed between the anchor time, i.e. the anchor epoch, and the terminus time, i.e. the terminus epoch (310). The terminus time may be the current time if the method is performed in real-time. Step (310) of FIG. 4 constitutes an implementation of step s10 described with reference to each of FIGS. 1 to 3. Based on all valid delta-phase observations, the state vector and its associated covariance matrix are computed using the method of least squares, robust estimation, or Kalman filtering (320). Step (320) of FIG. 4 constitutes an implementation of step s20 described with reference to each of FIGS. 1 to 3.

A determination is then made at (330) to identify any carrier phase measurements that are valid at the current epoch, but are cycle slipped or otherwise affected by a change in phase ambiguity with respect to the anchor epoch. Synthetic carrier phase measurements are then estimated, i.e. generated, for the anchor epoch at (340) and stored for use at subsequent epochs. The method ends at (350), although it may be repeated (for example as explained above, see penultimate paragraph before the beginning of section A). Step (340) of FIG. 4 constitutes an implementation of step s30a described with reference to each of FIGS. 1 and 3.

In some embodiments of the invention, parallel processing tasks are performed. Hereinafter, the operations comprising steps s10, s20, s30, and s40 are regarded as forming a processing task, and the method in one embodiment comprises performing at least two processing tasks in parallel.

In one embodiment, each processing task comprises at least one of: its own initial anchor epoch, its own initial terminus epoch, its own criterion to decide whether to increase the value of the anchor epoch, its own time-differenced carrier phase observables computed by subtracting carrier phase observables associated with satellites from a specific NSS (the underlying advantage of this approach being to create some robustness against the failure of an entire satellite system), and its own time-differenced carrier phase observables computed by subtracting carrier phase observables associated with a specific combination of NSS frequencies.

Hence, the at least two processing tasks may perform the respective computations and determinations independently from one another. Each of the at least two processing tasks may thus be executed on separate (virtual) compute units such as on separate CPU cores or CPU threads. Thus, the computational efficiency may be improved. Furthermore, each of the two or more processing tasks may be associated with a specific NSS and specific combination of NSS frequencies. For example, a first processing task may observe NSS signals from GPS satellites and the second processing task may observe NSS signals from Galileo satellites. In another example, both the first processing task and the second processing task may observe NSS signals from GPS satellites, wherein the NSS signals observed by the first processing task are on the L1 frequency band and the NSS signals observed by the second processing are on the L2 frequency band. In a further example, the starting epochs of different delta-phase processing tasks may be staggered (as schematically illustrated in reference [4], FIG. 14). In yet another exemplary approach, the processing tasks may be separated in terms of different combinations of GNSS tracking bands, e.g. having an L1-specific task, an ionosphere-free task, and a narrow-lane combination task.

In one embodiment, the method may further comprise processing outputs of the at least two processing tasks by at least one of: (a) comparing the outputs of the processing tasks and selecting one of the outputs to exclude outliers, wherein, preferably, this is carried out for at least three processing tasks using a majority voting approach to exclude outliers; (b) forming a weighted mean combination of parameter estimates, where a weighting factor used for the weighted mean is determined from formal precisions of the parameter estimates; and (c) selecting parameter estimates from the processing task that produced the best precisions (obtained from the covariance matrix). In such a manner, the precision of the delta-carrier-phase observables may be further improved and/or the situation in which many NSS satellites are available may advantageously be dealt with.

System

Figure 5:
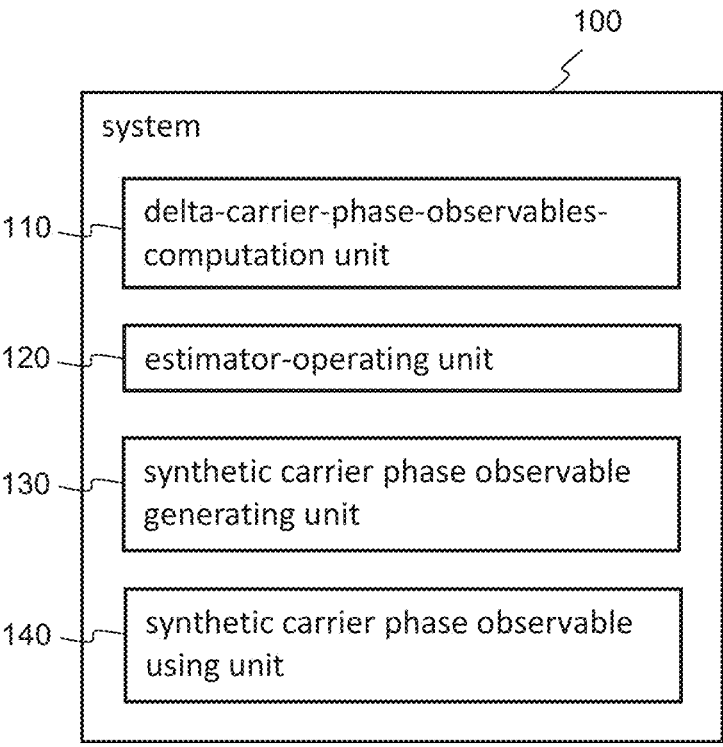
FIG. 5 schematically illustrates a system in one embodiment of the invention.

FIG. 5 schematically illustrates a system 100 in one embodiment of the invention. System 100 comprises an NSS receiver and/or a processing entity capable of receiving data from the NSS receiver. The system operates to estimate parameters derived from NSS signals useful to, i.e. suitable to, determine a position. The NSS receiver is configured for observing at least one NSS signal from each of a plurality of NSS satellites over multiple epochs. System 100 comprises a delta-carrier-phase-observables-computation unit 110, an estimator-operating unit 120, a synthetic carrier phase observable generating unit 130, and a synthetic carrier phase observable using unit 140.

Delta-carrier-phase-observables-computation unit 110 is configured for computing time-differenced carrier phase observables, i.e. delta carrier phase observables, by subtracting carrier phase observables of an epoch, i.e. an anchor epoch, from carrier phase observables of a subsequent epoch, i.e. a terminus epoch, as described above. Estimator-operating unit 120 is configured for operating, for the terminus epoch, an estimation process, referred to as "estimator", wherein the estimator uses state variables and computes values of its state variables at least based on the computed delta carrier phase observables, as described above. Synthetic carrier phase observable generating unit 130 is configured for generating a synthetic carrier phase observable for the anchor epoch, for each of at least one carrier phase observable of the terminus epoch for which one of the following applies: (i) a change in phase ambiguity has been determined to have occurred with respect to the corresponding carrier phase observable of the anchor epoch, and, (ii) at the anchor epoch, no corresponding carrier phase observable was tracked, as described above. Synthetic carrier phase observable using unit 140 is configured for using at least one generated synthetic carrier phase observable to compute delta carrier phase observables between the anchor epoch and at least one epoch subsequent to the terminus epoch, as described above.

In one embodiment, a vehicle comprises a system 100 as described above. The vehicle may for example be an autonomous vehicle such as a self-driving vehicle, a driverless vehicle, a robotic vehicle, a highly automated vehicle, a partially automated vehicle, an aircraft, or an unmanned aerial vehicle. The vehicle may for example be a car, a truck, a bus, a motorcycle, a tractor, a combine harvester, a crop sprayer, a construction equipment, a grader, or a train. Exemplary applications may include machine guidance, construction work, operation of unmanned aerial vehicles (UAV), also known as drones, and operation of unmanned surface vehicles/vessels (USV).

Additional Remarks

Any of the above-described methods and their embodiments may be implemented, at least partially, by means of a computer program or a set of computer programs. The computer program(s) may be loaded on an apparatus, such as for example an NSS receiver (running on a rover station, on a reference station, or within a vehicle) or a server (which may comprise one or a plurality of computers). Therefore, the invention also relates, in some embodiments, to a computer program or set of computer programs, which, when carried out on an apparatus as described above, such as for example an NSS receiver (running on a rover station, on a reference station, or within a vehicle) or a server, carries out any one of the above-described methods and their embodiments The invention also relates, in some embodiments, to a computer-readable medium or a computer-program product including the above-mentioned computer program. The computer-readable medium or computer-program product may for instance be a magnetic tape, an optical memory disk, a magnetic disk, a magneto-optical disk, an SSD, a CD-ROM, a DVD, a CD, a flash memory unit, or the like, wherein the computer program is permanently or temporarily stored. In some embodiments, a computer-readable medium (or to a computer-program product) has computer-executable instructions for carrying out any one of the methods of the invention.

In one embodiment, a computer program as claimed may be delivered to the field as a computer program product, for example through a firmware or software update to be installed on receivers already in the field. This applies to each of the above-described methods and apparatuses.

NSS receivers may include one or more antennas, configured to receive the signals at the frequencies broadcasted by the satellites, processor units, one or a plurality of accurate clocks (such as crystal oscillators), one or a plurality of central processing units (CPU), one or a plurality of memory units (RAM, ROM, flash memory, or the like), and a display for displaying position information to a user.

Where the terms "delta-carrier-phase-observables-computation unit", "estimator-operating unit", "synthetic carrier phase observable generating unit", "synthetic carrier phase observable using unit", and the like are used herein as units (or sub-units) of an apparatus (such as an NSS receiver), no restriction is made regarding how distributed the constituent parts of a unit (or sub-unit) may be. That is, the constituent parts of a unit (or sub-unit) may be distributed in different software or hardware components or devices for bringing about the intended function. Further, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding and are not intended to limit the scope of the invention. The scope of the invention is defined by the appended claims.

Abbreviations

AltBOC alternative BOC (modulation)
BDS BeiDou Navigation Satellite System
BOC binary offset carrier (modulation)

C/A coarse/acquisition (code)
CD compact disc
CD-ROM compact disk-read only memory
CPU central processing unit
DVD digital versatile disc
Eq. equation
GNSS global navigation satellite system
GPS Global Positioning System
I/O input/output
IP Internet Protocol
LHS left-hand side
LMS least mean squares
NAVIC NAVigation with Indian Constellation
NSS navigation satellite system
PLL phase locked loop
ppm part(s) per million
PPP precise point positioning
PRN pseudo-random noise
QZSS Quasi-Zenith Satellite System
RAM random-access memory
RF radio frequency
RHS right-hand side
RNSS regional navigation satellite system
ROM read-only memory
RTK real-time kinematic
s second
SSD solid-state disk

REFERENCES

[1] Hofmann-Wellenhof, B., et al., "GNSS, Global Navigation Satellite Systems, GPS, GLONASS, Galileo, & more", Springer-Verlag Wien, 2008.

[2] WO 2012/151006 A1 (application number: PCT/US2012/029694) titled "GNSS Signal Processing with Delta Phase" (Trimble ref.: TNL A-2705PCT).

[3] Jan Van Sickle, "Two Types of Observables | GEOG 862: GPS and GNSS for Geospatial Professionals", John A. Dutton e-Education Institute, College of Earth and Mineral Sciences, The Pennsylvania State University, retrieved from https://www.e-education.psu.edu/geog862/node/1752 on Nov. 8, 2021.

[4] Co-pending European patent application EP22206935.3, filed on Nov. 11, 2022, and titled "Methods and systems for forming time-differenced navigation satellite system observables" (Trimble ref.: 22038-EP).

[5] EP 3 035 080 A1 titled "Navigation satellite system positioning involving the generation of correction information" (Trimble ref.: A4396).

[6] EP 3 130 943 A1 titled "Navigation satellite system positioning involving the generation of tropospheric correction information" (Trimble ref.: 15072-EPO).

[7] Maronna, R.A., Martin, R.D., Yohai, V.J. 2006, Robust Statistics, Theory and Methods, John Wiley & Sons, West Sussex, England, ISBN: 0-470-01092-4.

[8] Brown, R.G. & Hwang, P.Y.C. 1997, Introduction to random signals and applied Kalman filtering: with MAT-LAB exercise and solutions, 3rd Ed. John Wiley & Sons, New York, ISBN: 0-471-12839-2.

[9] Enge, P. & Misra, P. 2001, Global Positioning System, Signals, Measurements, and Performance, Ganga-Jamuna Press, ISBN: 0-9709544-0-9.

[10] Teunissen, P.J.G. 1990, "An Integrity and Quality Control Procedure for Use in Multi Sensor Integration", ION-GPS-1990, Colorado Springs, CO, September 19-21, pp. 513-522

The invention claimed is:

1. Method, carried out by at least one of a navigation satellite system receiver, hereinafter abbreviated as "NSS receiver", and a processing entity capable of receiving data from the NSS receiver, for estimating parameters useful to determine a position, the NSS receiver observing NSS signals from NSS satellites, the method comprising:
computing time-differenced carrier phase observables, hereinafter referred to as "delta carrier phase observables", by subtracting carrier phase observables of an epoch, hereinafter referred to as "anchor epoch", from carrier phase observables of a subsequent epoch, hereinafter referred to as "terminus epoch";
operating, for the terminus epoch, an estimation process, hereinafter referred to as "estimator", wherein the estimator uses state variables and computes values of its state variables at least based on the computed delta carrier phase observables;
generating, for each of at least one carrier phase observable of the terminus epoch for which one of the following applies:
a change in phase ambiguity has been determined to have occurred with respect to the corresponding carrier phase observable of the anchor epoch, and,
at the anchor epoch, no corresponding carrier phase observable was tracked,
a synthetic carrier phase observable for the anchor epoch;
using at least one generated synthetic carrier phase observable to compute delta carrier phase observables between the anchor epoch and at least one epoch subsequent to the terminus epoch; and
operating, for the at least one epoch subsequent to the terminus epoch, the estimator, the estimator computing values of its state variables at least based on the computed delta carrier phase observables between the anchor epoch and the at least one epoch subsequent to the terminus epoch.

2. Method of claim 1, wherein generating a synthetic carrier phase observable for the anchor epoch is based on:
the corresponding carrier phase observable at the terminus epoch; and
an estimated change in range from the NSS receiver to a NSS satellite from which the carrier phase observable under consideration originates, from the anchor epoch to the terminus epoch.

3. Method of claim 2, wherein generating a synthetic carrier phase observable for the anchor epoch is further based on:
values of the estimator's state variables computed for the terminus epoch; and
a plurality of direction cosines, applicable at the terminus epoch, for a range from the NSS receiver to the NSS satellite from which the carrier phase observable under consideration originates.

4. Method of claim 2, wherein generating a synthetic carrier phase observable for the anchor epoch is further based on:
an estimated change in the NSS receiver's clock error, from the anchor epoch to the terminus epoch.

5. Method of claim 1, wherein generating a synthetic carrier phase observable for the anchor epoch comprises:
allocating, in the estimator, an additional state to the synthetic carrier phase observable for the anchor epoch; and
generating the synthetic carrier phase observable for the anchor epoch as part of the operating of the estimator for the terminus epoch.

6. Method according to claim 1, wherein the estimator comprises at least one of a Kalman filter, a least squares estimator, and a robust estimator.

7. Method according to claim 1, wherein the term "subsequent" means "following in time".

8. Method according to claim 1, wherein
the term "subsequent" means "following in order";
the method is carried out at least partially in a post-processing manner; and
the epochs are ordered in reverse time at least for the purpose of
computing the delta carrier phase observables;
operating, for the terminus epoch, an estimator;
generating one or a plurality of synthetic carrier phase observable for the anchor epoch; and
using at least one generated synthetic carrier phase observable to compute delta carrier phase observables between the anchor epoch and at least one epoch subsequent to the terminus epoch.

9. Non-transitory computer program or set of non-transitory computer programs comprising computer-readable instructions configured, when executed on a computer or set of computers, to cause the computer or set of computers to carry out the method according to claim 1.

10. Non-transitory computer program product or non-transitory storage mediums comprising a computer program or set of computer programs according to claim 9.

11. Method according to claim 1, wherein generating comprises:
generating, for each of, and if any is identified, at least one carrier phase observable of the terminus epoch for which a change in phase ambiguity has been determined to have occurred with respect to the corresponding carrier phase observable of the anchor epoch, a synthetic carrier phase observable for the anchor epoch; and
generating, for each of, and if any is identified, at least one carrier phase observable of the terminus epoch for which at the anchor epoch no corresponding carrier phase observable was tracked, a synthetic carrier phase observable for the anchor epoch.

12. System comprising at least one of a navigation satellite system receiver, hereinafter abbreviated as "NSS receiver", and a processing entity capable of receiving data from the NSS receiver, the system being for estimating parameters useful to determine a position, the NSS receiver observing NSS signals from NSS satellites, and the system being configured to perform steps comprising:
computing time-differenced carrier phase observables, hereinafter referred to as "delta carrier phase observables", by subtracting carrier phase observables of an epoch, hereinafter referred to as "anchor epoch", from carrier phase observables of a subsequent epoch, hereinafter referred to as "terminus epoch";
operating, for the terminus epoch, an estimation process, hereinafter referred to as "estimator", wherein the estimator uses state variables and computes values of its state variables at least based on the computed delta carrier phase observables;
generating, for each of at least one carrier phase observable of the terminus epoch for which one of the following applies:
a change in phase ambiguity has been determined to have occurred with respect to the corresponding carrier phase observable of the anchor epoch, and,
at the anchor epoch, no corresponding carrier phase observable was tracked,
a synthetic carrier phase observable for the anchor epoch;
using at least one generated synthetic carrier phase observable to compute delta carrier phase observables between the anchor epoch and at least one epoch subsequent to the terminus epoch; and
operating, for the at least one epoch subsequent to the terminus epoch, the estimator, the estimator computing values of its state variables at least based on the computed delta carrier phase observables between the anchor epoch and the at least one epoch subsequent to the terminus epoch.

13. Vehicle comprising a system according to claim 12, the vehicle preferably being at least one of: a motor vehicle, an agricultural tractor, a combine harvester, a crop sprayer, a construction equipment, a truck, a bus, a train, a motorcycle, an autonomous vehicle, a self-driving vehicle, a driverless vehicle, a robotic vehicle, a highly automated vehicle, an aircraft, and an unmanned aerial vehicle.

* * * * *